US012768664B2

(12) United States Patent
Shenfeld et al.

(10) Patent No.: US 12,768,664 B2
(45) Date of Patent: Oct. 20, 2026

(54) SYSTEMS AND METHODS FOR DETECTING VEHICLE WHEEL SLIPS

(71) Applicant: Mobileye Vision Technologies Ltd., Jerusalem (IL)

(72) Inventors: Moshe Shenfeld, Jerusalem (IL); Gilad Oskar, Rehovot (IL)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 0 days.

(21) Appl. No.: 18/956,752

(22) Filed: Nov. 22, 2024

(65) Prior Publication Data

US 2025/0198773 A1 Jun. 19, 2025

Related U.S. Application Data

(63) Continuation of application No. 17/756,857, filed as application No. PCT/US2021/038444 on Jun. 22, 2021, now Pat. No. 12,174,026.
(Continued)

(51) Int. Cl.
*G01C 21/34* (2006.01)
*B60W 10/18* (2012.01)
(Continued)

(52) U.S. Cl.
CPC ......... *G01C 21/3461* (2013.01); *B60W 10/18* (2013.01); *B60W 10/20* (2013.01);
(Continued)

(58) Field of Classification Search
CPC ........... G01C 21/3461; G01C 21/3841; B60W 10/18; B60W 10/20; B60W 10/22;
(Continued)

(56) References Cited

U.S. PATENT DOCUMENTS

2018/0222502 A1* 8/2018 Paralikar ................ B61C 15/00
2018/0283895 A1* 10/2018 Aikin ................ G01C 21/3415
(Continued)

FOREIGN PATENT DOCUMENTS

EP 1302378 A2 * 4/2003 ............. B60T 8/172
GB 2494413 A 3/2013

OTHER PUBLICATIONS

International Search Report and Written Opinion dated Nov. 25, 2021 in corresponding Application No. PCT/US2021/038444, 18 pages.
(Continued)

*Primary Examiner* — Edwin A Young
(74) *Attorney, Agent, or Firm* — Finnegan, Henderson, Farabow, Garrett, Dunner, LLP

(57) ABSTRACT

The present disclosure relates to systems and methods for identifying a wheel slip condition. In one implementation, a processor may receive a plurality of image frames acquired by an image capture device of a vehicle. The processor may also determine based on analysis of the images one or more indicators of a motion of the vehicle; and determine a predicted wheel rotation corresponding to the motion of the vehicle. The processor may further receive sensor outputs indicative of measured wheel rotation associated with a wheel; and compare the predicted wheel rotation to the measured wheel rotation for the wheel. The processor may additionally detect a wheel slip condition wheel based on a discrepancy between the predicted wheel rotation and the measured wheel rotation; and initiate at least one navigational action in response to the detected wheel slip condition associated with the wheel.

20 Claims, 33 Drawing Sheets

Related U.S. Application Data

(60) Provisional application No. 63/052,542, filed on Jul. 16, 2020, provisional application No. 63/042,155, filed on Jun. 22, 2020.

(51) Int. Cl.

| | |
|---|---|
| ***B60W 10/20*** | (2006.01) |
| ***B60W 10/22*** | (2006.01) |
| ***B60W 30/02*** | (2012.01) |
| ***B60W 30/18*** | (2012.01) |
| ***B60W 50/00*** | (2006.01) |
| ***B60W 50/14*** | (2020.01) |
| ***B60W 60/00*** | (2020.01) |
| ***G01C 21/00*** | (2006.01) |

(52) U.S. Cl.

CPC ............ *B60W 10/22* (2013.01); *B60W 30/02* (2013.01); *B60W 30/18172* (2013.01); *B60W 50/0097* (2013.01); *B60W 50/14* (2013.01); *B60W 60/0015* (2020.02); *G01C 21/3841* (2020.08); *B60W 2520/26* (2013.01); *B60W 2555/20* (2020.02); *B60W 2756/10* (2020.02)

(58) Field of Classification Search

CPC ........... B60W 30/02; B60W 30/18172; B60W 50/0097; B60W 50/14; B60W 60/0015; B60W 2520/26; B60W 2555/20; B60W 2756/10

See application file for complete search history.

(56) References Cited

U.S. PATENT DOCUMENTS

| | | | | |
|---|---|---|---|---|
| 2019/0161084 | A1 | 5/2019 | Greenwood | |
| 2019/0301880 | A1* | 10/2019 | Werner | G01C 21/3415 |
| 2020/0286369 | A1 | 9/2020 | Ferrin | |
| 2020/0398844 | A1* | 12/2020 | Ruybal | B60W 10/08 |
| 2022/0316896 | A1 | 10/2022 | Umeda | |

OTHER PUBLICATIONS

Hans B. Pacejka, "Tyre and Vehicle Dynamics" ReferEX, Sep. 2005, 1.2.1. Introduction to Tyre Characteristics.

* cited by examiner

SYSTEMS AND METHODS FOR DETECTING VEHICLE WHEEL SLIPS

CROSS REFERENCES TO RELATED APPLICATIONS

This application is a continuation of Ser. No. 17/756,857 filed Jun. 3, 2022, which is a National Phase Application of International Application No. PCT/US2021/038444, filed Jun. 22, 2021, which claims the benefit of priority of United States Provisional Patent Application No. 63/042,155, filed on Jun. 22, 2020, and U.S. Provisional Patent Application No. 63/052,542, filed on Jul. 16, 2020. The foregoing applications are incorporated herein by reference in their entirety.

BACKGROUND

Technical Field

The present disclosure relates generally to image analysis systems and methods for vehicle navigation.

Background Information

As technology continues to advance, the goal of a fully autonomous vehicle that is capable of navigating on roadways is on the horizon. Autonomous vehicles may need to take into account a variety of factors and make appropriate decisions based on those factors to safely and accurately reach an intended destination. For example, an autonomous vehicle may need to process and interpret visual information (e.g., information captured from a camera) and may also use information obtained from other sources (e.g., from a GPS device, a speed sensor, an accelerometer, a suspension sensor, etc.). At the same time, in order to navigate to a destination, an autonomous vehicle may also need to identify its location within a particular roadway (e.g., a specific lane within a multi-lane road), navigate alongside other vehicles, avoid obstacles and pedestrians, observe traffic signals and signs, and travel from on road to another road at appropriate intersections or interchanges. Harnessing and interpreting vast volumes of information collected by an autonomous vehicle as the vehicle travels to its destination poses a multitude of design challenges. The sheer quantity of data (e.g., captured image data, map data, GPS data, sensor data, etc.) that an autonomous vehicle may need to analyze, access, and/or store poses challenges that can in fact limit or even adversely affect autonomous navigation. Furthermore, if an autonomous vehicle relies on traditional mapping technology to navigate, the sheer volume of data needed to store and update the map poses daunting challenges.

SUMMARY

Embodiments consistent with the present disclosure provide systems and methods for autonomous vehicle navigation. The disclosed embodiments may use cameras to provide autonomous vehicle navigation features. For example, consistent with the disclosed embodiments, the disclosed systems may include one, two, or more cameras that monitor the environment of a vehicle. The disclosed systems may provide a navigational response based on, for example, an analysis of images captured by one or more of the cameras.

In an embodiment, a system for navigating a vehicle may include at least one processor comprising circuitry and a memory is provided. The memory may include instructions that when executed by the circuitry cause the at least one processor to receive a plurality of image frames acquired by an image capture device associated with the vehicle, wherein the plurality of image frames are representative of an environment of the vehicle; determine, based on analysis of two or more of the plurality of images, one or more indicators of a motion of the vehicle relative to capture times associated with the two or more of the plurality of images; determine, for at least one wheel of the vehicle, a predicted wheel rotation corresponding to the motion of the vehicle relative to the capture times associated with the two or more of the plurality of images; receive one or more sensor outputs indicative of measured wheel rotation associated with the at least one wheel of the vehicle; compare the predicted wheel rotation to the measured wheel rotation for the at least one wheel of the vehicle; detect a wheel slip condition associated with the at least one wheel of the vehicle based on a discrepancy between the predicted wheel rotation and the measured wheel rotation; and initiate at least one navigational action in response to the detected wheel slip condition associated with the at least one wheel of the vehicle.

In an embodiment, a method for navigating a vehicle is provided. The method comprising: receiving a plurality of image frames acquired by an image capture device associated with the vehicle, wherein the plurality of image frames are representative of an environment of the vehicle; determining, based on analysis of two or more of the plurality of images, one or more indicators of a motion of the vehicle relative to capture times associated with the two or more of the plurality of images; determining, for at least one wheel of the vehicle, a predicted wheel rotation corresponding to the motion of the vehicle relative to the capture times associated with the two or more of the plurality of images; receiving one or more sensor outputs indicative of measured wheel rotation associated with the at least one wheel of the vehicle; comparing the predicted wheel rotation to the measured wheel rotation for the at least one wheel of the vehicle; detecting a wheel slip condition associated with the at least one wheel of the vehicle based on a discrepancy between the predicted wheel rotation and the measured wheel rotation; and initiating at least one navigational action in response to the detected wheel slip condition associated with the at least one wheel of the vehicle.

In an embodiment, a server-based navigation system may include at least one processor comprising circuitry and a memory. The memory may include instructions that when executed by the circuitry cause the at least one processor to receive from a plurality of harvesting vehicles indicators of detected wheel slip conditions associated with at least one wheel; correlate the indicators of detected wheel slip conditions with respect to one or more geographic locations; and generate and transmit navigational information to at least one entity based on the correlated indicators of detected wheel slip conditions with respect to one or more geographic locations.

In an embodiment, a method may comprise receiving from a plurality of harvesting vehicles indicators of detected wheel slip conditions associated with at least one wheel; correlating the indicators of detected wheel slip conditions with respect to one or more geographic locations; and generating and transmit navigational information to at least one entity based on the correlated indicators of detected wheel slip conditions with respect to one or more geographic locations.

Consistent with other disclosed embodiments, non-transitory computer-readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
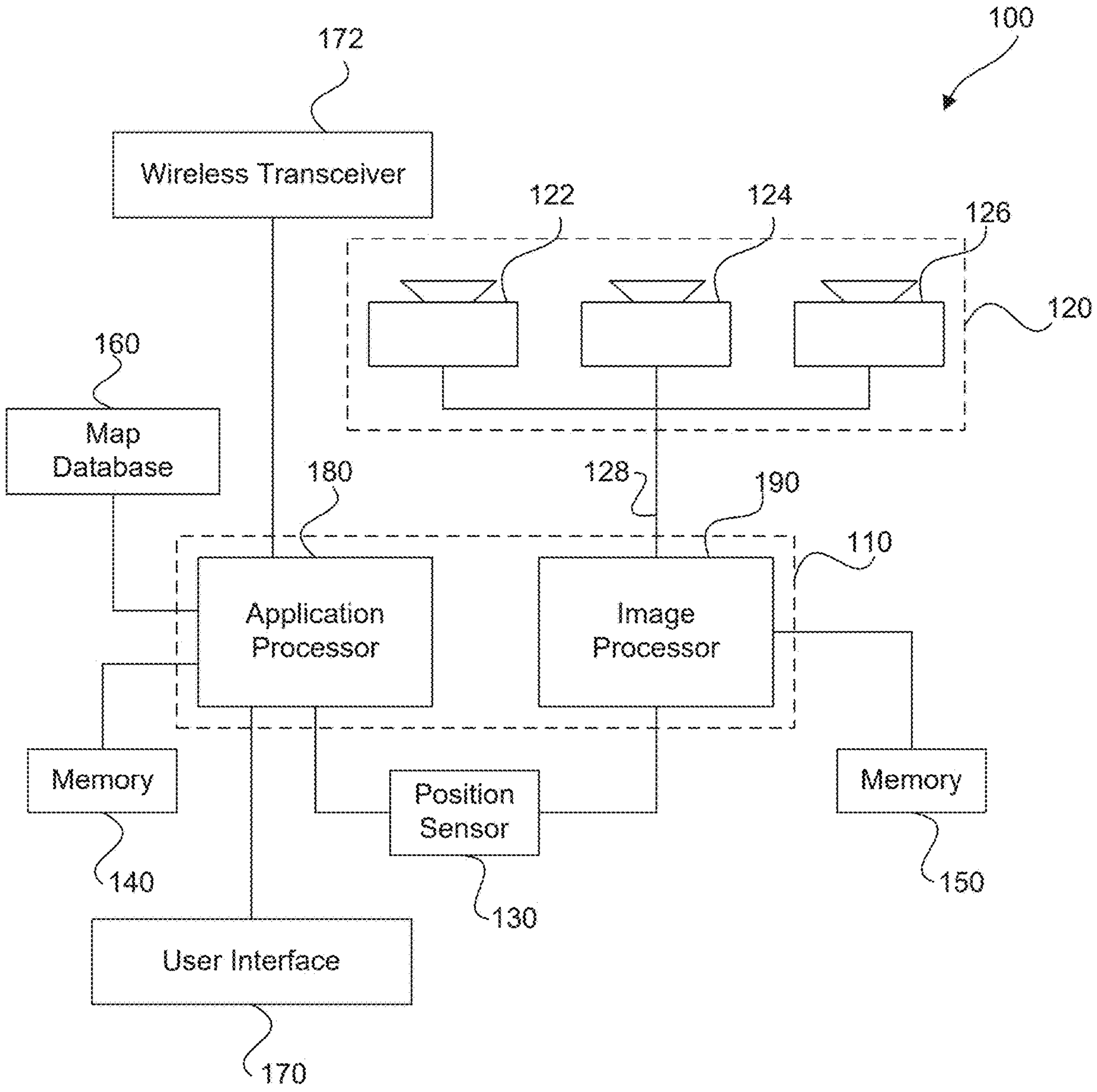
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples.

Instead, the proper scope is defined by the appended claims.

Autonomous Vehicle Overview

As used throughout this disclosure, the term "autonomous vehicle" refers to a vehicle capable of implementing at least one navigational change without driver input. A "navigational change" refers to a change in one or more of steering, braking, or acceleration of the vehicle. To be autonomous, a vehicle need not be fully automatic (e.g., fully operation without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints), but may leave other aspects to the driver (e.g., braking). In some cases, autonomous vehicles may handle some or all aspects of braking, speed control, and/or steering of the vehicle.

As human drivers typically rely on visual cues and observations order to control a vehicle, transportation infrastructures are built accordingly, with lane markings, traffic signs, and traffic lights are all designed to provide visual information to drivers. In view of these design characteristics of transportation infrastructures, an autonomous vehicle may include a camera and a processing unit that analyzes visual information captured from the environment of the vehicle. The visual information may include, for example, components of the transportation infrastructure (e.g., lane markings, traffic signs, traffic lights, etc.) that are observable by drivers and other obstacles (e.g., other vehicles, pedestrians, debris, etc.). Additionally, an autonomous vehicle may also use stored information, such as information that provides a model of the vehicle's environment when navigating. For example, the vehicle may use GPS data, sensor data (e.g., from an accelerometer, a speed sensor, a suspension sensor, etc.), and/or other map data to provide information related to its environment while the vehicle is traveling, and the vehicle (as well as other vehicles) may use the information to localize itself on the model.

In some embodiments in this disclosure, an autonomous vehicle may use information obtained while navigating (e.g., from a camera, GPS device, an accelerometer, a speed sensor, a suspension sensor, etc.). In other embodiments, an autonomous vehicle may use information obtained from past navigations by the vehicle (or by other vehicles) while navigating. In yet other embodiments, an autonomous vehicle may use a combination of information obtained while navigating and information obtained from past navigations. The following sections provide an overview of a system consistent with the disclosed embodiments, following by an overview of a forward-facing imaging system and methods consistent with the system. The sections that follow disclose systems and methods for constructing, using, and updating a sparse map for autonomous vehicle navigation.

System Overview

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, a user interface 170, and a wireless transceiver 172. Processing unit 110 may include one or more processing devices. In some embodiments, processing unit 110 may include an applications processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras), such as image capture device 122, image capture device 124, and image capture device 126. System 100 may also include a data interface 128 communicatively connecting processing device 110 to image acquisition device 120. For example, data interface 128 may include any wired and/or wireless link or links for transmitting image data acquired by image accusation device 120 to processing unit 110.

Wireless transceiver 172 may include one or more devices configured to exchange transmissions over an air interface to one or more networks (e.g., cellular, the Internet, etc.) by use of a radio frequency, infrared frequency, magnetic field, or an electric field. Wireless transceiver 172 may use any known standard to transmit and/or receive data (e.g., Wi-Fi, Bluetooth®, Bluetooth Smart, 802.15.4, ZigBee, etc.). Such transmissions can include communications from the host vehicle to one or more remotely located servers. Such transmissions may also include communications (one-way or two-way) between the host vehicle and one or more target vehicles in an environment of the host vehicle (e.g., to facilitate coordination of navigation of the host vehicle in view of or together with target vehicles in the environment of the host vehicle), or even a broadcast transmission to unspecified recipients in a vicinity of the transmitting vehicle.

Both applications processor 180 and image processor 190 may include various types of processing devices. For example, either or both of applications processor 180 and image processor 190 may include a microprocessor, preprocessors (such as an image preprocessor), a graphics processing unit (GPU), a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, etc. Various processing devices may be used, including, for example, processors available from manufacturers such as Intel®, AMD®, etc., or GPUs available from manufacturers such as NVIDIA®, ATI®, etc. and may include various architectures (e.g., x86 processor, ARM®, etc.).

In some embodiments, applications processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture consists of two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, may be used in the disclosed embodiments. In other examples, the EyeQ4® and/or the EyeQ5® may be used in the disclosed embodiments. Of course, any newer or future EyeQ processing devices may also be used together with the disclosed embodiments.

Any of the processing devices disclosed herein may be configured to perform certain functions. Configuring a processing device, such as any of the described EyeQ processors or other controller or microprocessor, to perform certain functions may include programming of computer executable instructions and making those instructions available to the processing device for execution during operation of the processing device. In some embodiments, configuring a processing device may include programming the processing device directly with architectural instructions. For example, processing devices such as field-programmable gate arrays (FPGAs), application-specific integrated circuits (ASICs), and the like may be configured using, for example, one or more hardware description languages (HDLs).

In other embodiments, configuring a processing device may include storing executable instructions on a memory that is accessible to the processing device during operation. For example, the processing device may access the memory to obtain and execute the stored instructions during operation.

In either case, the processing device configured to perform the sensing, image analysis, and/or navigational functions disclosed herein represents a specialized hardware-based system in control of multiple hardware based components of a host vehicle.

While FIG. 1 depicts two separate processing devices included in processing unit 110, more or fewer processing devices may be used. For example, in some embodiments, a single processing device may be used to accomplish the tasks of applications processor 180 and image processor 190. In other embodiments, these tasks may be performed by more than two processing devices. Further, in some embodiments, system 100 may include one or more of processing unit 110 without including other components, such as image acquisition unit 120.

Processing unit 110 may comprise various types of devices. For example, processing unit 110 may include various devices, such as a controller, an image preprocessor, a central processing unit (CPU), a graphics processing unit (GPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The GPU may also comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., applications processor 180 and/or image processor 190), may control operation of various aspects of system 100. These memory units may include various databases and image processing software, as well as a trained system, such as a neural network, or a deep neural network, for example. The memory units may include random access memory (RAM), read only memory (ROM), flash memory, disk drives, optical storage, tape storage, removable storage and/or any other types of storage. In some embodiments, memory units 140, 150 may be separate from the applications processor 180 and/or image processor 190. In other embodiments, these memory units may be integrated into applications processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to applications processor 180 and/or image processor 190.

In some embodiments, system 100 may include components such as a speed sensor (e.g., a tachometer, a speedometer) for measuring a speed of vehicle 200 and/or an accelerometer (either single axis or multiaxis) for measuring acceleration of vehicle 200.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, applications processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.). In some cases, map database 160 may store a sparse data model including polynomial representations of certain road features (e.g., lane markings) or target trajectories for the host vehicle. Systems and methods of generating such a map are discussed below with references to FIGS. 8-19.

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 122, 124, and 126 will be further described with reference to FIGS. 2B-2E, below.

Figure 2A:
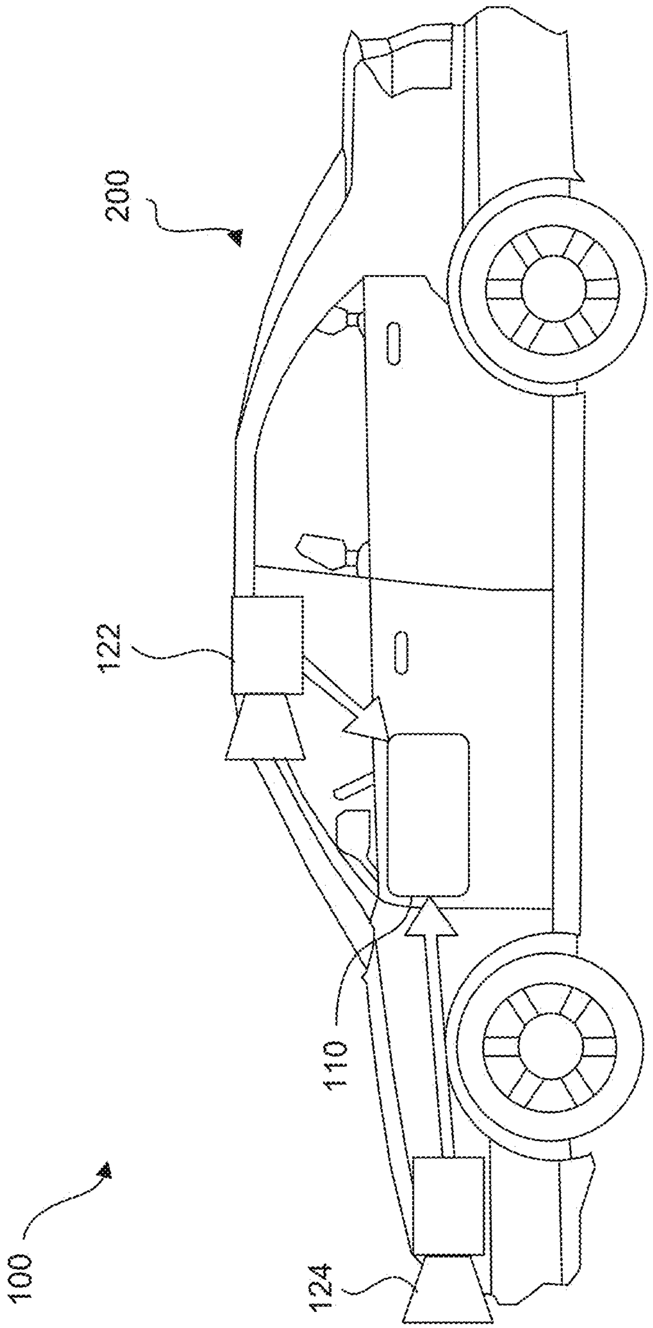
FIG. 2A is a diagrammatic side view representation of an exemplary vehicle including a system consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera), in other embodiments, such as those discussed in connection with FIGS. 2B-2E, multiple image capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver. Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

As discussed earlier, wireless transceiver 172 may and/or receive data over one or more networks (e.g., cellular networks, the Internet, etc.). For example, wireless transceiver 172 may upload data collected by system 100 to one or more servers, and download data from the one or more servers. Via wireless transceiver 172, system 100 may receive, for example, periodic or on demand updates to data stored in map database 160, memory 140, and/or memory 150. Similarly, wireless transceiver 172 may upload any data (e.g., images captured by image acquisition unit 120, data received by position sensor 130 or other sensors, vehicle control systems, etc.) from by system 100 and/or any data processed by processing unit 110 to the one or more servers.

System 100 may upload data to a server (e.g., to the cloud) based on a privacy level setting. For example, system 100 may implement privacy level settings to regulate or limit the types of data (including metadata) sent to the server that may uniquely identify a vehicle and or driver/owner of a vehicle. Such settings may be set by user via, for example, wireless transceiver 172, be initialized by factory default settings, or by data received by wireless transceiver 172.

In some embodiments, system 100 may upload data according to a "high" privacy level, and under setting a setting, system 100 may transmit data (e.g., location information related to a route, captured images, etc.) without any details about the specific vehicle and/or driver/owner. For example, when uploading data according to a "high" privacy setting, system 100 may not include a vehicle identification number (VIN) or a name of a driver or owner of the vehicle, and may instead of transmit data, such as captured images and/or limited location information related to a route.

Other privacy levels are contemplated. For example, system 100 may transmit data to a server according to an "intermediate" privacy level and include additional information not included under a "high" privacy level, such as a make and/or model of a vehicle and/or a vehicle type (e.g., a passenger vehicle, sport utility vehicle, truck, etc.). In some embodiments, system 100 may upload data according to a "low" privacy level. Under a "low" privacy level setting, system 100 may upload data and include information sufficient to uniquely identify a specific vehicle, owner/driver, and/or a portion or entirely of a route traveled by the vehicle. Such "low" privacy level data may include one or more of, for example, a VIN, a driver/owner name, an origination point of a vehicle prior to departure, an intended destination of the vehicle, a make and/or model of the vehicle, a type of the vehicle, etc.

Figure 2B:
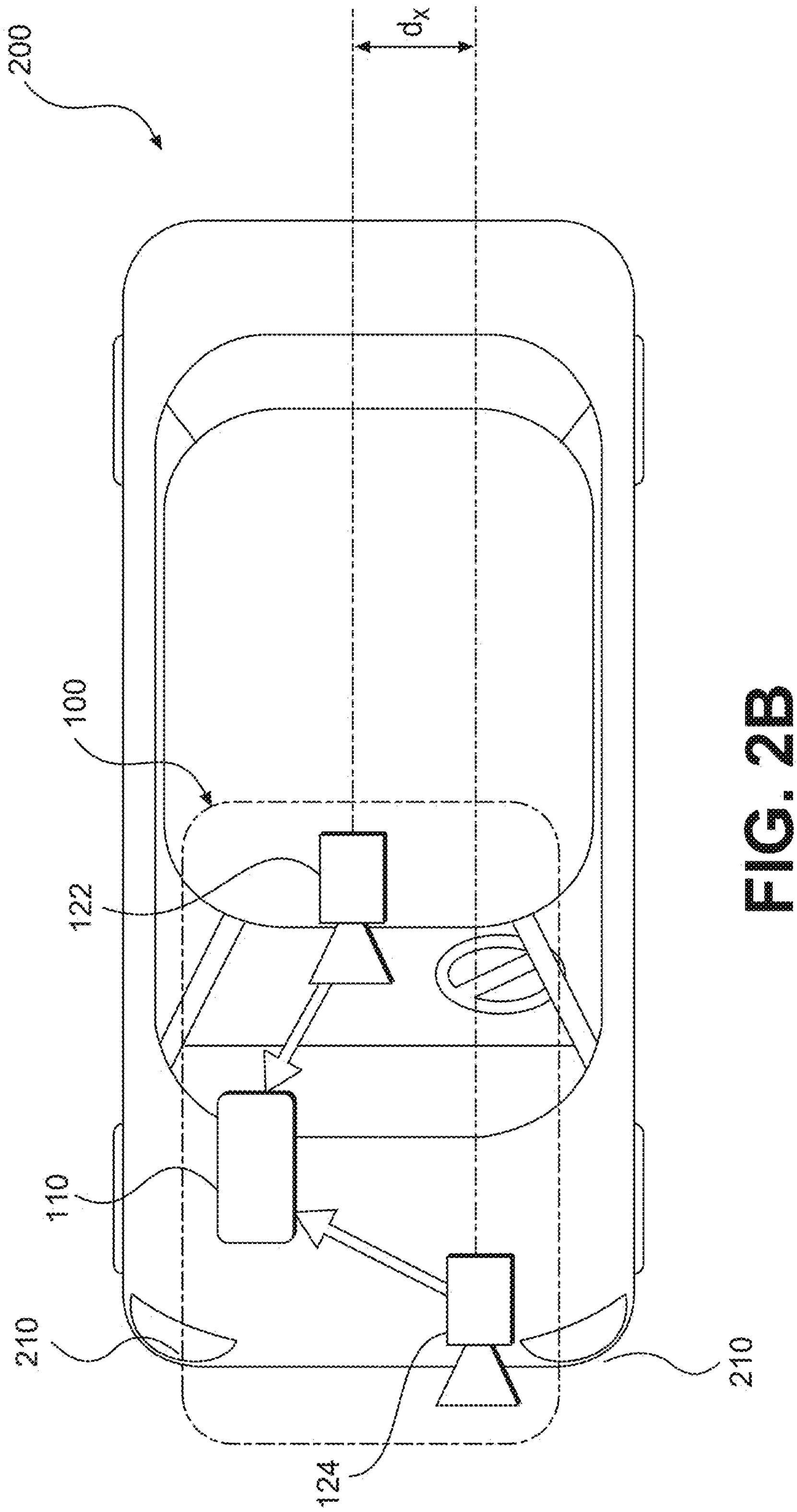
FIG. 2B is a diagrammatic top view representation of the vehicle and system shown in FIG. 2A consistent with the disclosed embodiments.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 2B, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
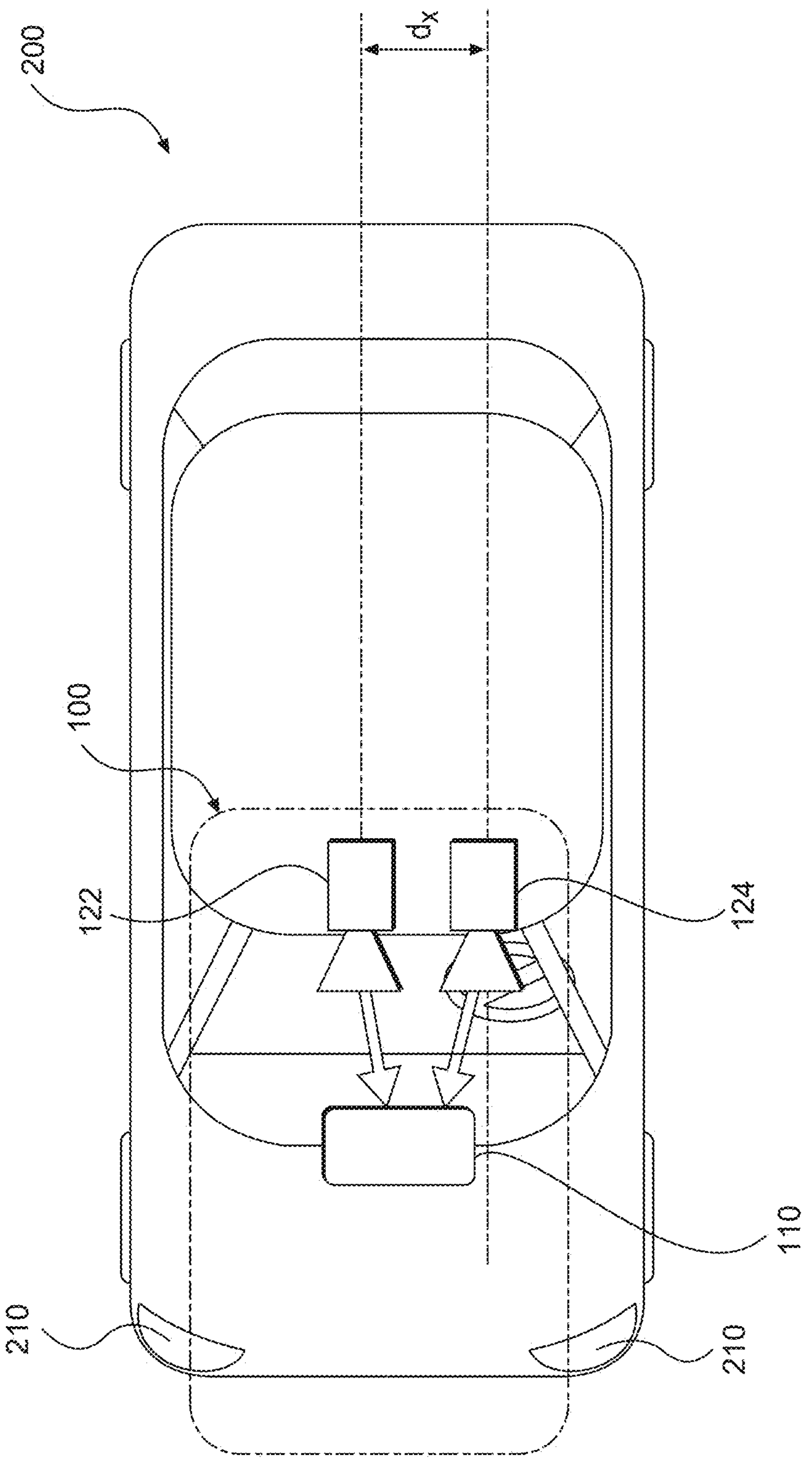
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
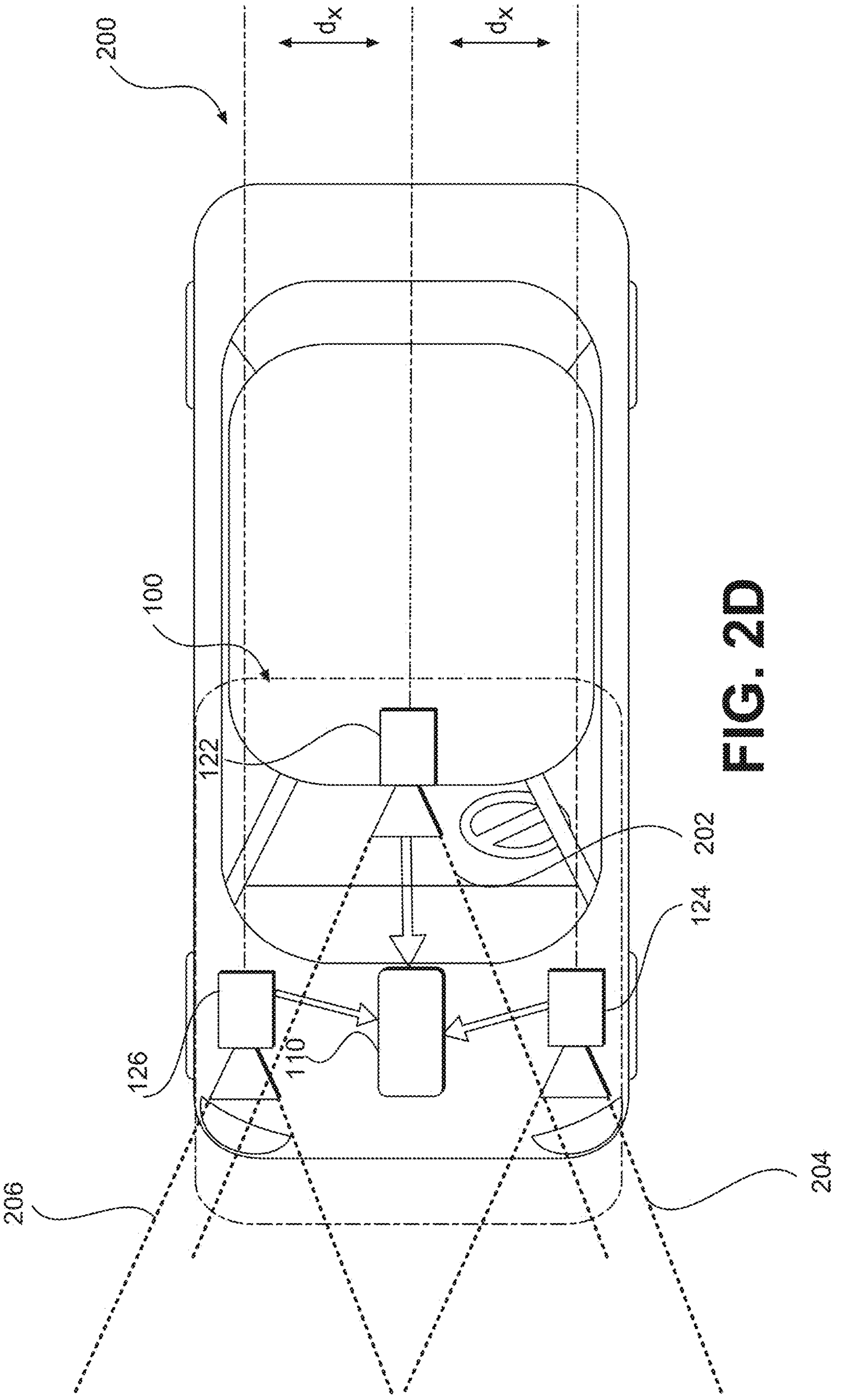
FIG. 2D is a diagrammatic top view representation of yet another embodiment of a vehicle including a system consistent with the disclosed embodiments.
Figure 2E:
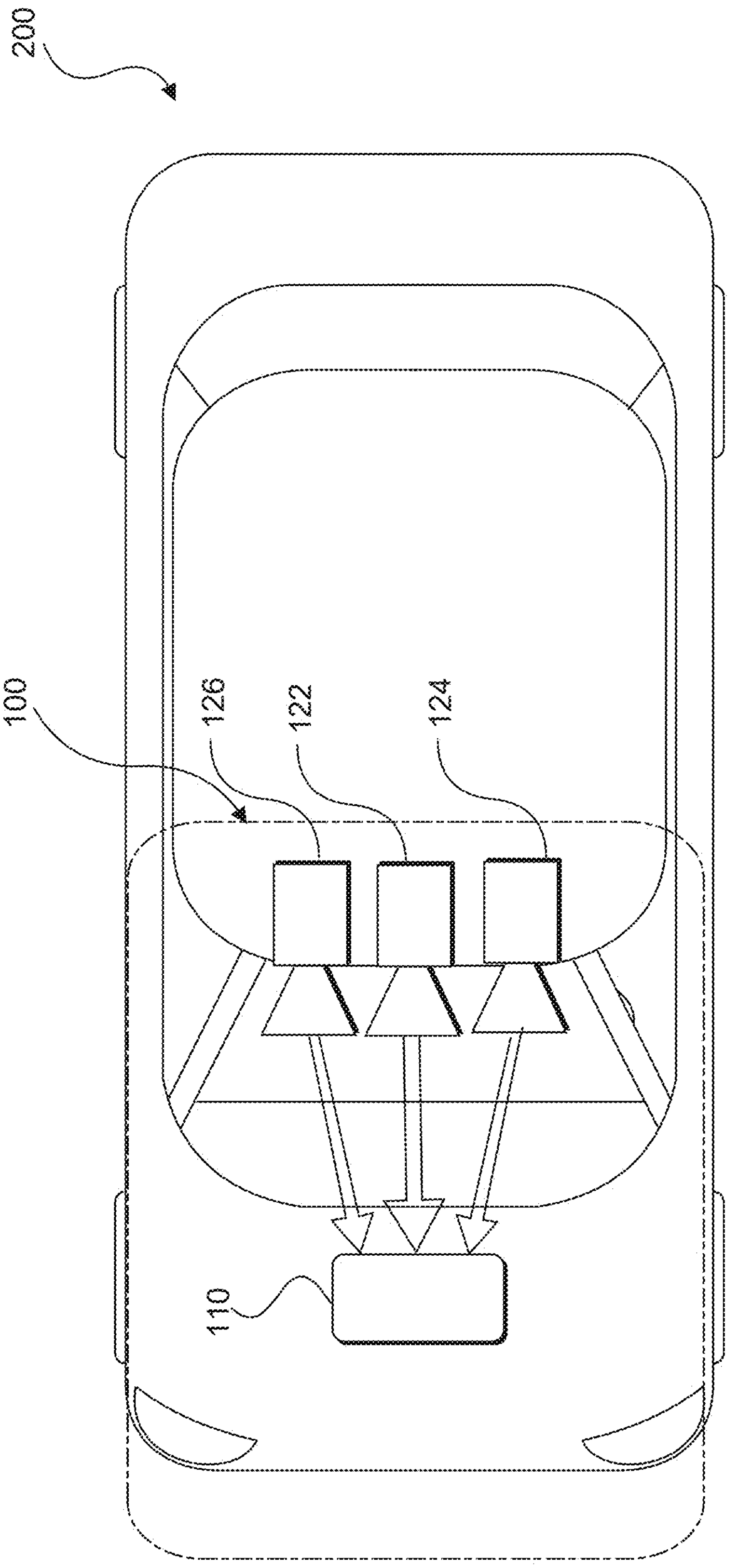
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts. It is also to be understood that disclosed embodiments are not limited to a particular type of vehicle 200 and may be applicable to all types of vehicles including automobiles, trucks, trailers, and other types of vehicles.

The first image capture device 122 may include any suitable type of image capture device. Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter. Image capture device 122 may include various optical elements. In some embodiments one or more lenses may be included, for example, to provide a desired focal length and field of view for the image capture device. In some embodiments, image capture device 122 may be associated with a 6 mm lens or a 12 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree FOV, 50 degree FOV, 52 degree FOV, or greater. Alternatively, image capture device 122 may be configured to have a narrow FOV in the range of 23 to 40 degrees, such as a 28 degree FOV or 36 degree FOV. In addition, image capture device 122 may be configured to have a wide FOV in the range of 100 to 180 degrees. In some embodiments, image capture device 122 may include a wide angle bumper camera or one with up to a 180 degree FOV. In some embodiments, image capture device 122 may be a 7.2 M pixel image capture device with an aspect ratio of about 2:1 (e.g., HxV=3800×1900 pixels) with about 100 degree horizontal FOV. Such an image capture device may be used in place of a three image capture device configuration. Due to significant lens distortion, the vertical FOV of such an image capture device may be significantly less than 50 degrees in implementations in which the image capture device uses a radially symmetric lens. For example, such a lens may not be radially symmetric which would allow for a vertical FOV greater than 50 degrees with 100 degree horizontal FOV.

The first image capture device 122 may acquire a plurality of first images relative to a scene associated with the vehicle 200. Each of the plurality of first images may be acquired as a series of image scan lines, which may be captured using a rolling shutter. Each scan line may include a plurality of pixels.

The first image capture device 122 may have a scan rate associated with acquisition of each of the first series of image scan lines. The scan rate may refer to a rate at which an image sensor can acquire image data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

In some embodiments, one or more of the image capture devices (e.g., image capture devices 122, 124, and 126) disclosed herein may constitute a high resolution imager and may have a resolution greater than 5 M pixel, 7 M pixel, 10 M pixel, or greater.

The use of a rolling shutter may result in pixels in different rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire FOV (such as FOV 202) at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 124 and the third image capturing device 126 may be any type of image capture device. Like the first image capture device 122, each of image capture devices 124 and 126 may include an optical axis. In one embodiment, each of image capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements. In some embodiments, lenses associated with image capture devices 124 and 126 may provide FOVs (such as FOVs 204 and 206) that are the same as, or narrower than, a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with the vehicle 200. Each of the plurality of second and third images may be acquired as a second and third series of image scan lines, which may be captured using a rolling shutter. Each scan line or row may have a plurality of pixels. Image capture devices 124 and 126 may have second and third scan rates associated with acquisition of each of image scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such as FOV 202) associated with image capture device 122 and a FOV (such as FOV 206) associated with image capture device 126.

Image capture devices 122, 124, and 126 may be located on vehicle 200 at any suitable relative heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by dx, as shown in FIGS. 2C and 2D. In some embodiments, fore or aft displacement (e.g., range displacement) may exist between image capture devices 122, 124, and 126. For example, image capture device 122 may be located 0.5 to 2 meters or more behind image capture device 124 and/or image capture device 126. This type of displacement may enable one of the image capture devices to cover potential blind spots of the other image capture device(s).

Image capture devices 122 may have any suitable resolution capability (e.g., number of pixels associated with the image sensor), and the resolution of the image sensor(s) associated with the image capture device 122 may be higher, lower, or the same as the resolution of the image sensor(s) associated with image capture devices 124 and 126. In some embodiments, the image sensor(s) associated with image capture device 122 and/or image capture devices 124 and 126 may have a resolution of 640×480, 1024×768, 1280×960, or any other suitable resolution.

The frame rate (e.g., the rate at which an image capture device acquires a set of pixel data of one image frame before moving on to capture pixel data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the timing of the frame rate. For example, one or more of image capture devices 122, 124, and 126 may include a selectable pixel delay period imposed before or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line scan rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they may include cameras having different fields of view (FOV) and focal lengths. The fields of view of image capture devices 122, 124, and 126 may include any desired area relative to an environment of vehicle 200, for example. In some embodiments, one or more of image capture devices 122, 124, and 126 may be configured to acquire image data from an environment in front of vehicle 200, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-up objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 m) while the other image capture devices (e.g., image capture devices 124 and 126) can acquire images of more distant objects (e.g., greater than 20 m, 50 m, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees, image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that a field of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent FOVs or may have partial overlap in their FOVs. In some embodiments, the fields of view of image capture devices 122, 124, and 126 may be aligned such that a center of the narrower FOV image capture devices 124 and/or 126 may be located in a lower half of the field of view of the wider FOV device 122.

Figure 2F:
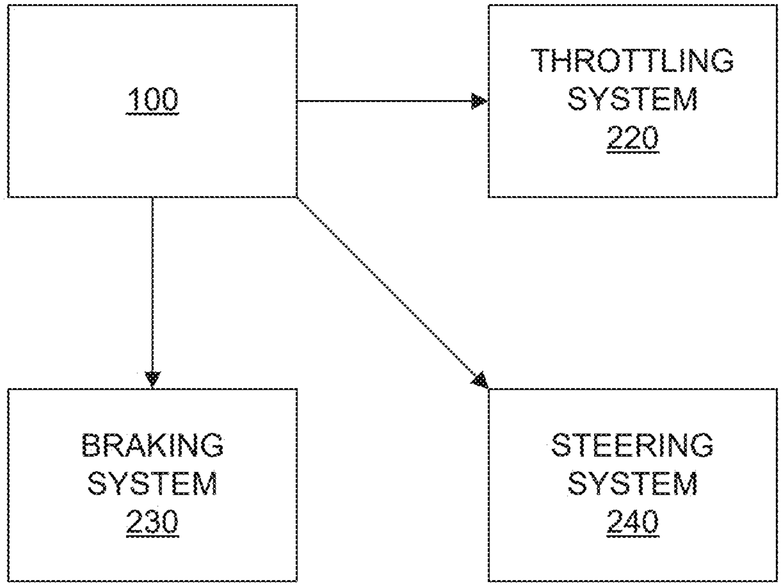
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, and steering system 240. System 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, and steering system 240 to navigate vehicle 200 (e.g., by causing an acceleration, a turn, a lane shift, etc.). Further, system 100 may receive inputs from one or more of throttling system 220, braking system 230, and steering system 24 indicating operating conditions of vehicle 200 (e.g., speed, whether vehicle 200 is braking and/or turning, etc.). Further details are provided in connection with FIGS. 4-7, below.

Figure 3A:
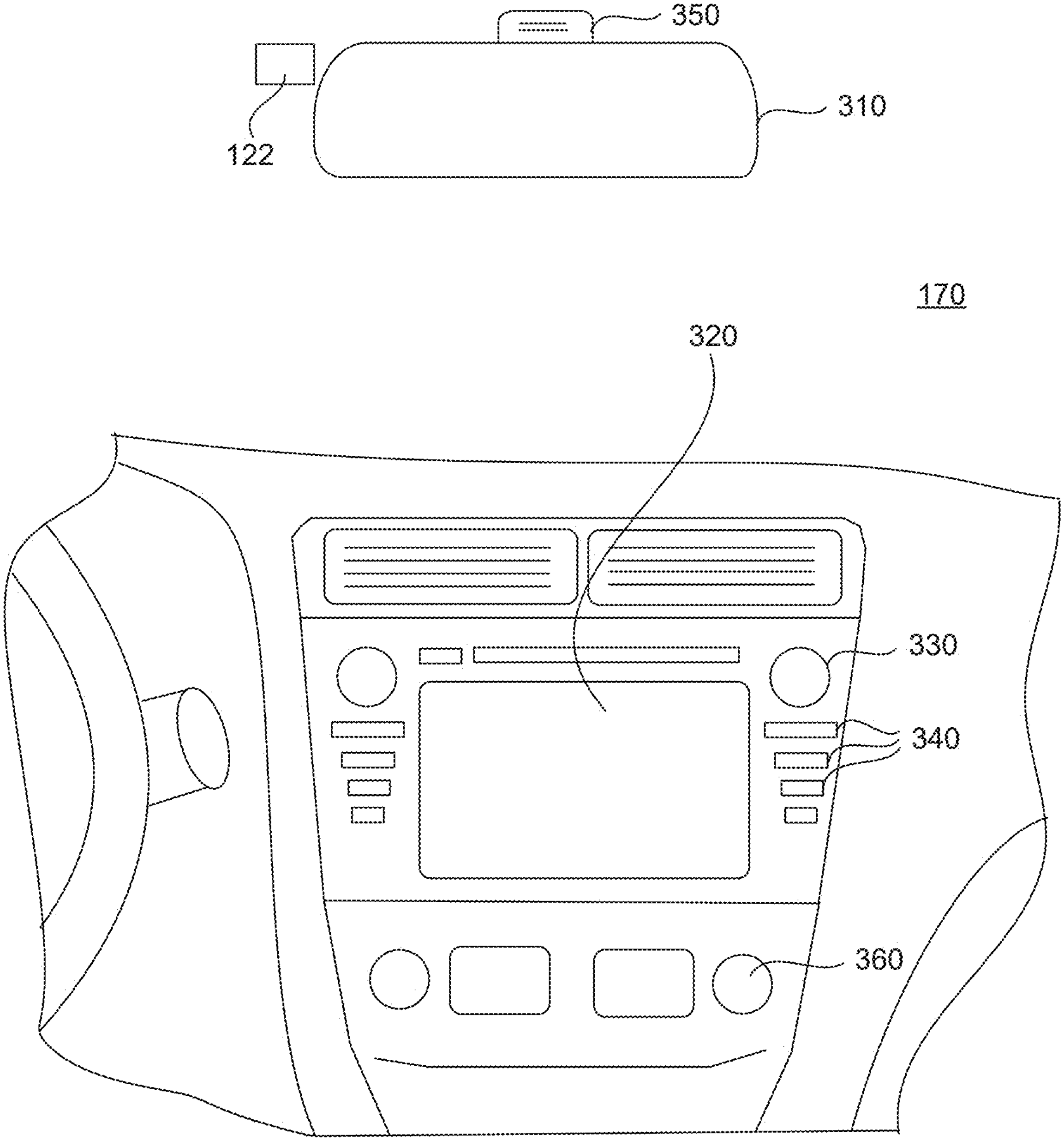
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
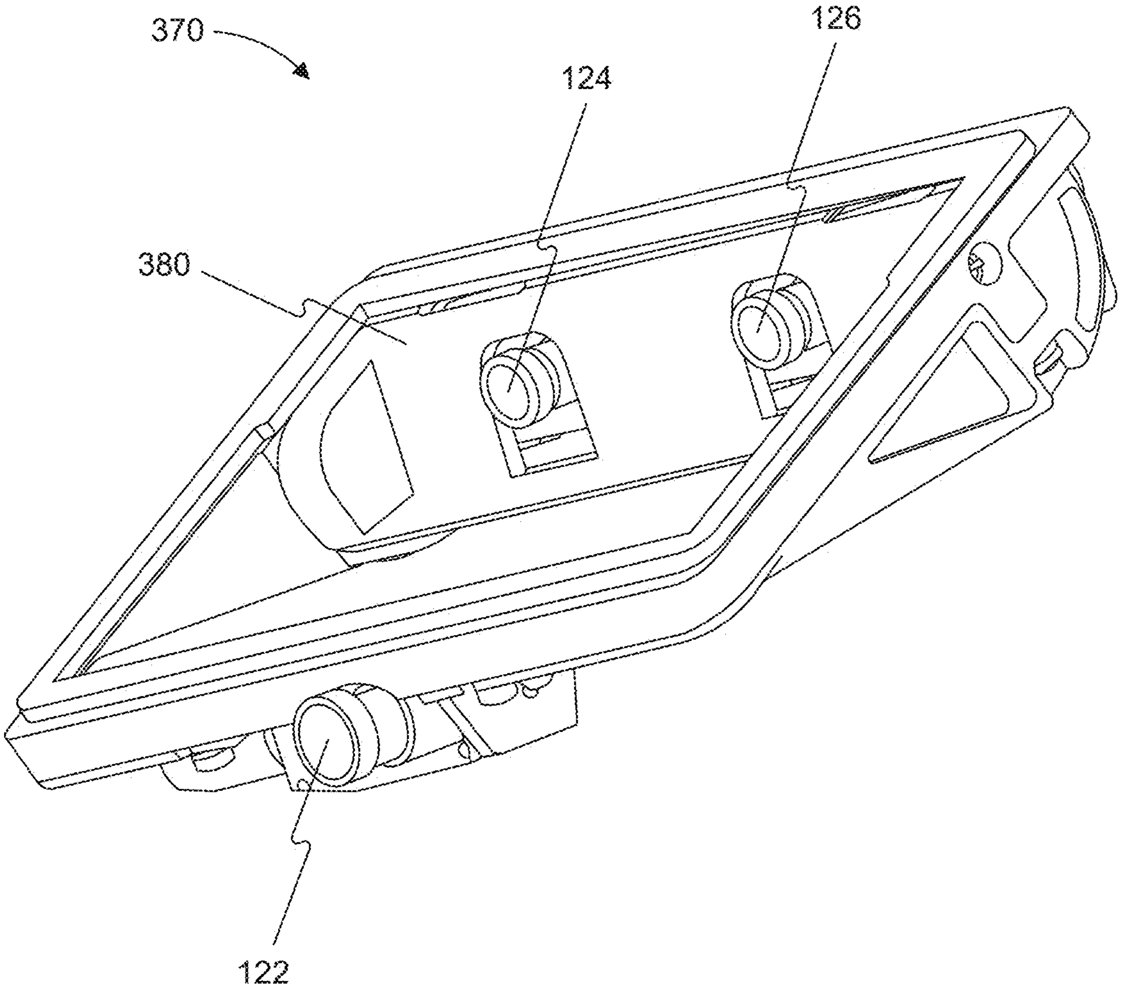
FIG. 3B is an illustration of an example of a camera mount that is configured to be positioned behind a rearview mirror and against a vehicle windshield consistent with the disclosed embodiments.
Figure 3C:
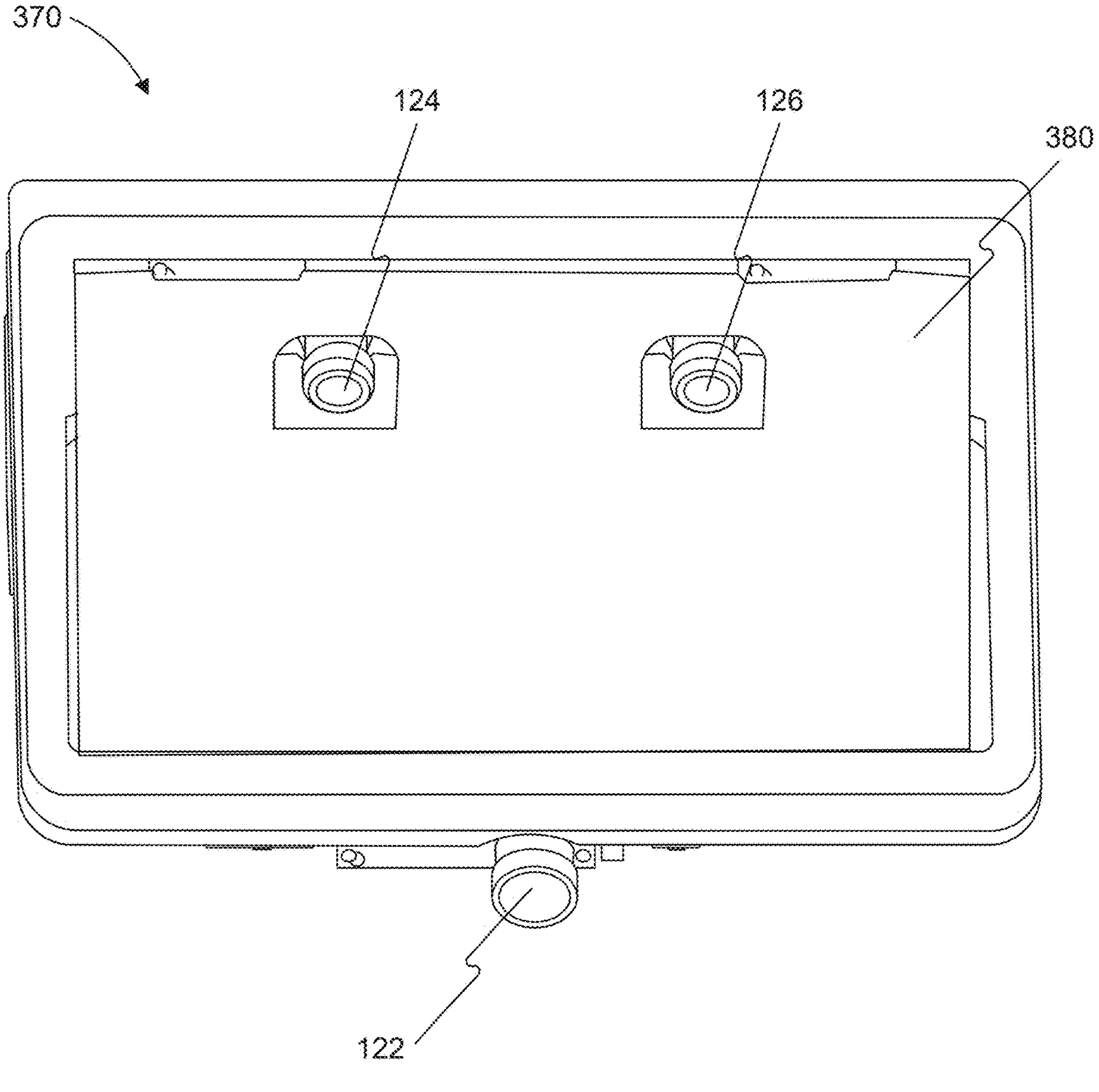
FIG. 3C is an illustration of the camera mount shown in FIG. 3B from a different perspective consistent with the disclosed embodiments.
Figure 3D:
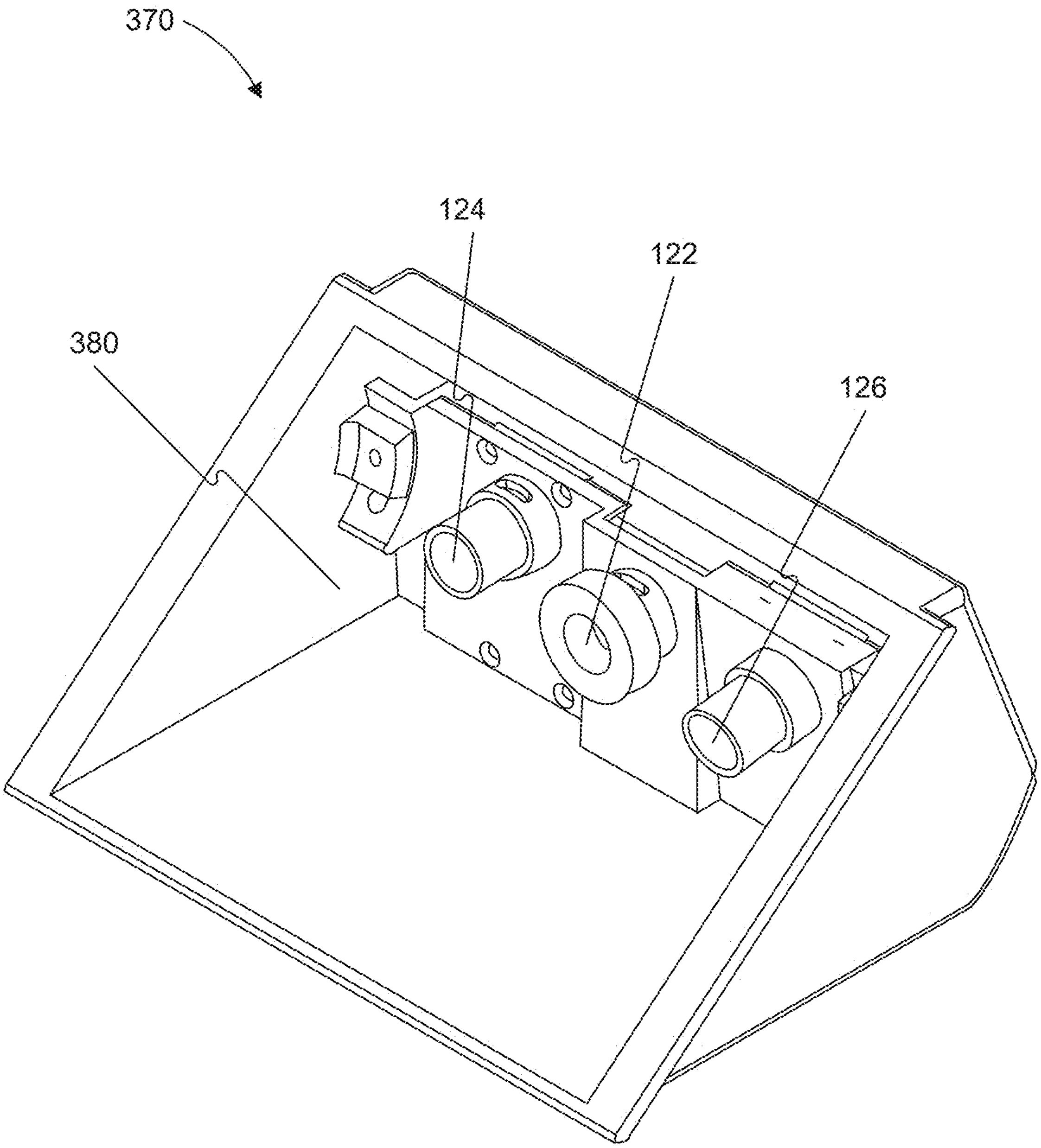
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that the shield aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 in response to the analysis.

As discussed below in further detail and consistent with various disclosed embodiments, system 100 may provide a variety of features related to autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings and/or alerts to vehicle occupants based on the analysis of the collected data. Additional details regarding the various embodiments that are provided by system 100 are provided below.

Forward-Facing Multi-Imaging System

As discussed above, system 100 may provide drive assist functionality that uses a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122, 124, and 126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122, 124, and 126 may be positioned behind rearview mirror 310 and positioned substantially side-by-side (e.g., 6 cm apart). Further, in some embodiments, as discussed above, one or more of image capture devices 122, 124, and 126 may be mounted behind glare shield 380 that is flush with the windshield of vehicle 200. Such shielding may act to minimize the impact of any reflections from inside the car on image capture devices 122, 124, and 126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122, 124, and 126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other road objects. Further, the first processing device may calculate a disparity of pixels between the images from the main camera and the narrow camera and create a 3D reconstruction of the environment of vehicle 200. The first processing device may then combine the 3D reconstruction with 3D map data or with 3D information calculated based on information from another camera.

The second processing device may receive images from main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images.

The third processing device may receive images from the wide FOV camera and process the images to detect vehicles, pedestrians, lane marks, traffic signs, traffic lights, and other road objects. The third processing device may further execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system). Furthermore, in some embodiments, redundancy and validation of received data may be supplemented based on information received from one more sensors (e.g., radar, lidar, acoustic sensors, information received from one or more transceivers outside of a vehicle, etc.).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
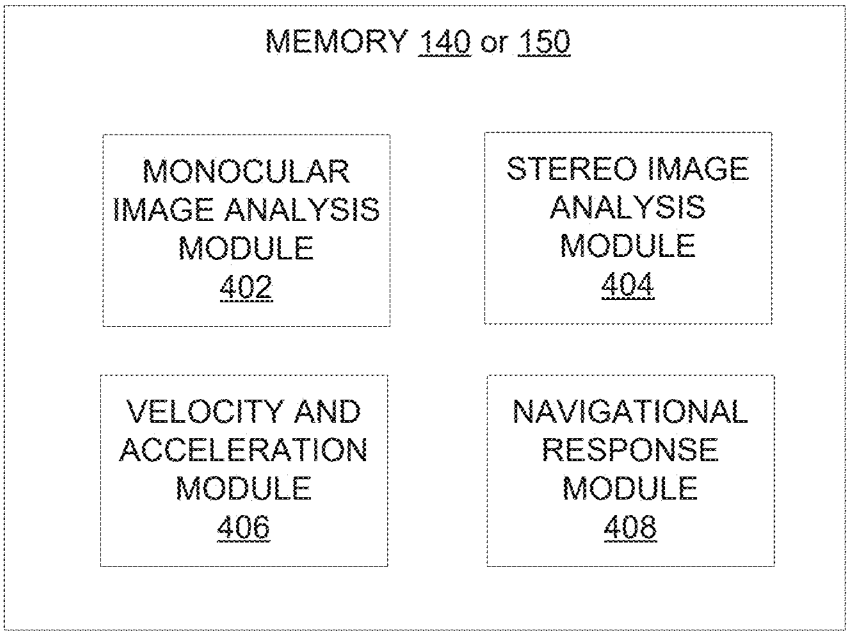
FIG. 4 is an exemplary block diagram of a memory configured to store instructions for performing one or more operations consistent with the disclosed embodiments.

FIG. 4 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any particular configuration of memory 140. Further, application processor 180 and/or image processor 190 may execute the instructions stored in any of modules 402, 404, 406, and 408 included in memory 140. One of skill in the art will understand that references in the following discussions to processing unit 110 may refer to application processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar, lidar, etc.) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with navigational response module 408.

In one embodiment, stereo image analysis module 404 may store instructions (such as computer vision software) which, when executed by processing unit 110, performs stereo image analysis of first and second sets of images acquired by a combination of image capture devices selected from any of image capture devices 122, 124, and 126. In some embodiments, processing unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408. Furthermore, in some embodiments, stereo image analysis module 404 may implement techniques associated with a trained system (such as a neural network or a deep neural network) or an untrained system, such as a system that may be configured to use computer vision algorithms to detect and/or label objects in an environment from which sensory information was captured and processed. In one embodiment, stereo image analysis module 404 and/or other image processing modules may be configured to use a combination of a trained and untrained system.

In one embodiment, velocity and acceleration module 406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or a relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Furthermore, any of the modules (e.g., modules 402, 404, and 406) disclosed herein may implement techniques associated with a trained system (such as a neural network or a deep neural network) or an untrained system.

Figure 5A:
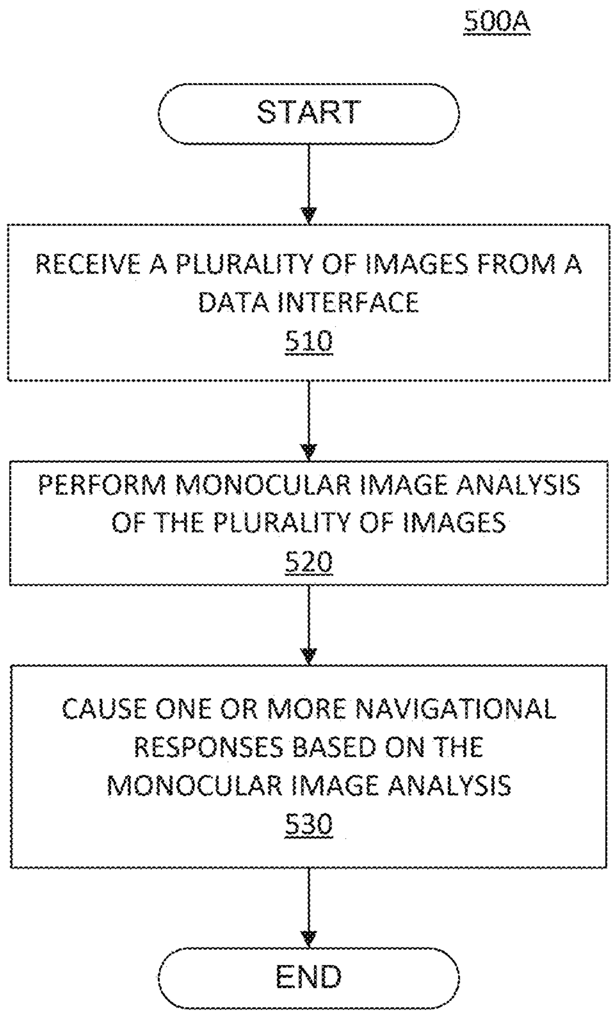
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based on monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality of images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road. Processing unit 110 may then use the 3D-map to detect the road surface, as well as hazards existing above the road surface.

At step 530, processing unit 110 may execute navigational response module 408 to cause one or more navigational responses in vehicle 200 based on the analysis performed at step 520 and the techniques as described above in connection with FIG. 4. Navigational responses may include, for example, a turn, a lane shift, a change in acceleration, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Figure 5B:
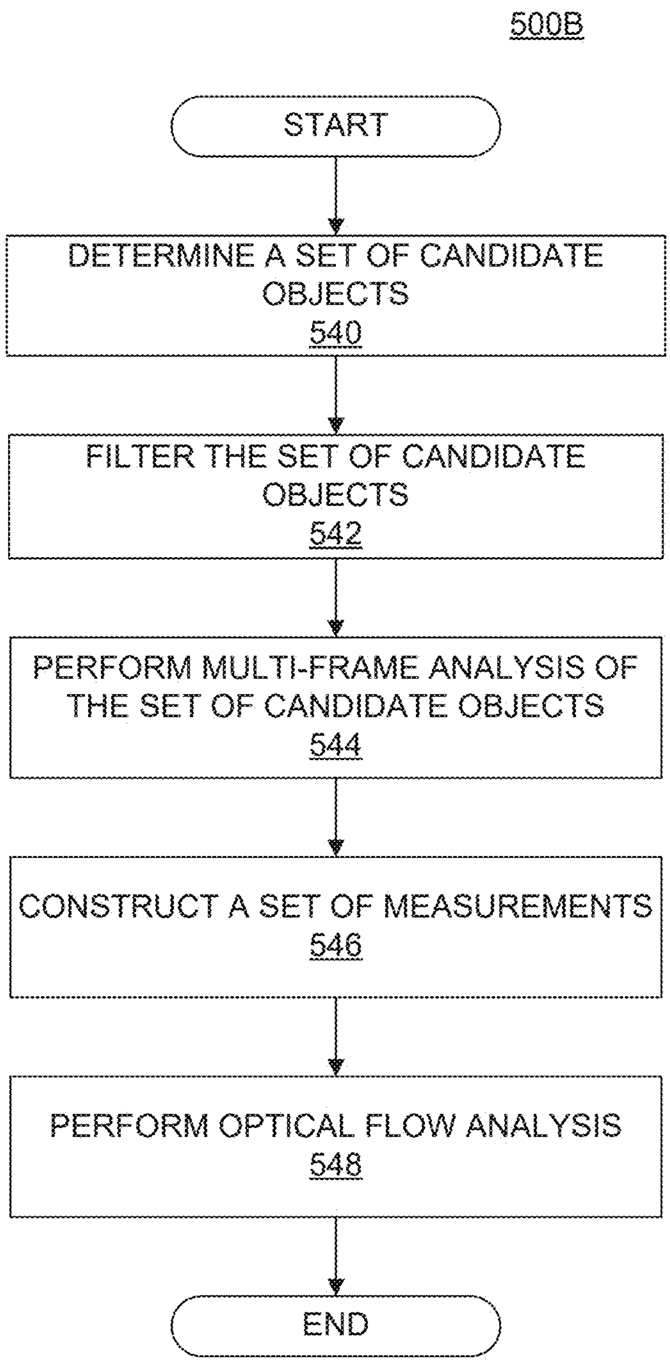
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses." For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (e.g., irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 200, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, position, velocity, and acceleration values (relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object). Thus, by performing steps 540-546, processing unit 110 may identify vehicles and pedestrians appearing within the set of captured images and derive information (e.g., position, speed, size) associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540-546 to provide redundancy for detecting vehicles and pedestrians and increase the reliability of system 100.

Figure 5C:
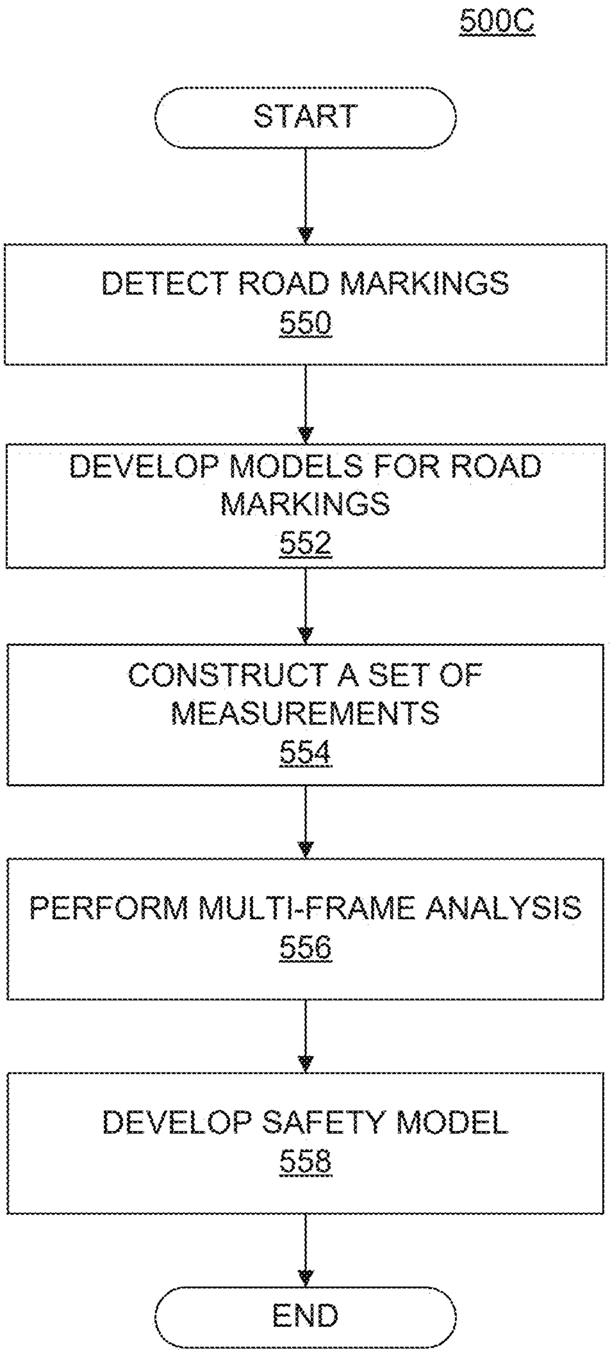
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 110 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in the road surface, as well as pitch and roll rates associated with vehicle 200. In addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating frame-by-frame data associated with detected segments. As processing unit 110 performs multi-frame analysis, the set of measurements constructed at step 554 may become more reliable and associated with an increasingly higher confidence level. Thus, by performing steps 550, 552, 554, and 556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To develop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
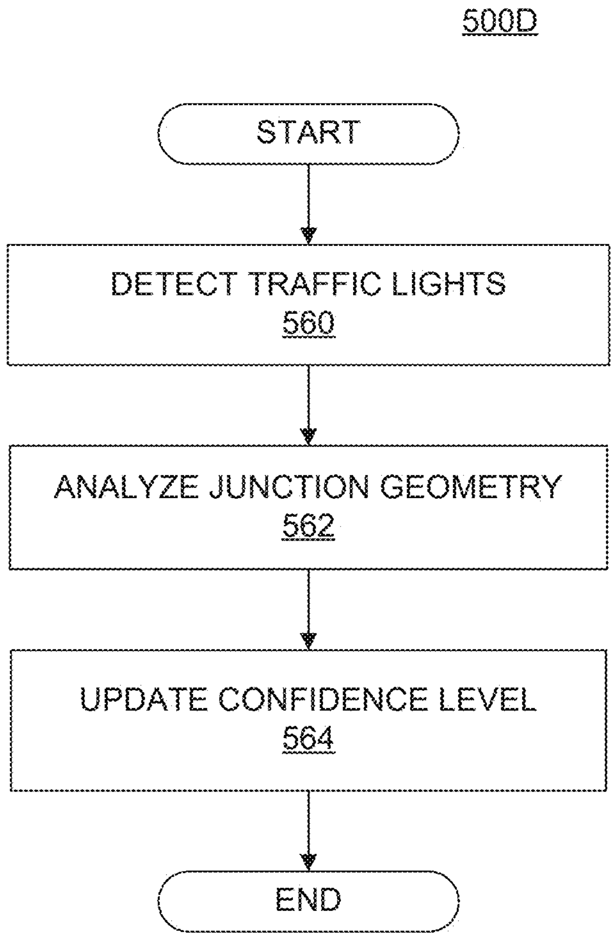
FIG. 5D is a flowchart showing an exemplary process for detecting traffic lights in a set of images consistent with the disclosed embodiments.

FIG. 5D is a flowchart showing an exemplary process 500D for detecting traffic lights in a set of images, consistent with disclosed embodiments. Processing unit 110 may execute monocular image analysis module 402 to implement process 500D. At step 560, processing unit 110 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter out those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, Processing unit 110 may determine a correspondence between the traffic lights detected at step 560 and the lanes appearing near vehicle 200.

As vehicle 200 approaches the junction, at step 564, processing unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By performing steps 560, 562, and 564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
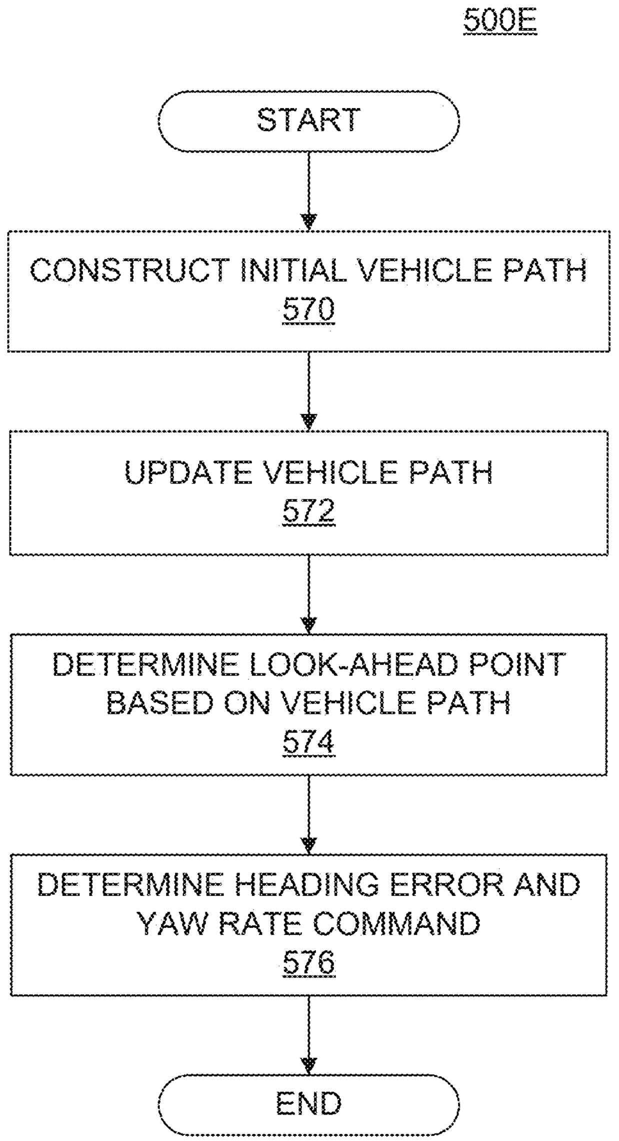
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates (x, z), and the distance $d_i$ between two points in the set of points may fall in the range of 1 to 5 meters. In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points in the vehicle path. In another embodiment, processing unit 110 may use one polynomial and an estimated lane width to offset each point of the vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the distance $d_k$ between two points in the set of points representing the vehicle path is less than the distance $d_i$ described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path).

At step 574, processing unit 110 may determine a look-ahead point (expressed in coordinates as $(x_l, z_l)$) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200, such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

At step 576, processing unit 110 may determine a heading error and yaw rate command based on the look-ahead point determined at step 574. Processing unit 110 may determine the heading error by calculating the arctangent of the look-ahead point, e.g., arctan $(x_l/z_l)$. Processing unit 110 may determine the yaw rate command as the product of the heading error and a high-level control gain. The high-level control gain may be equal to: (2/look-ahead time), if the look-ahead distance is not at the lower bound. Otherwise, the high-level control gain may be equal to: (2*speed of vehicle 200/look-ahead distance).

Figure 5F:
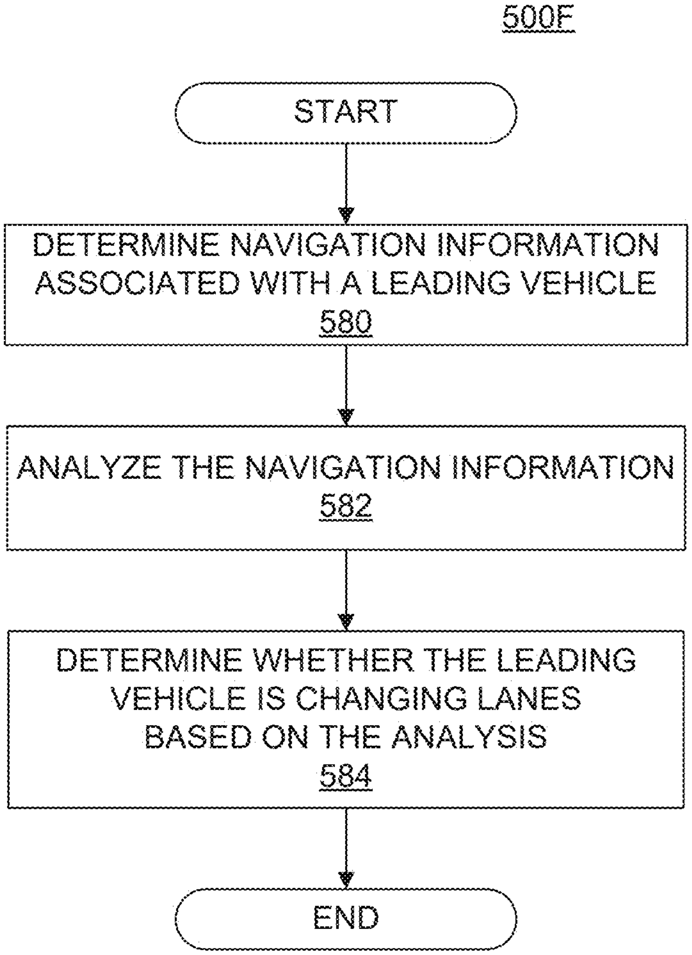
FIG. 5F is a flowchart showing an exemplary process for determining whether a leading vehicle is changing lanes consistent with the disclosed embodiments.

FIG. 5F is a flowchart showing an exemplary process 500F for determining whether a leading vehicle is changing lanes, consistent with the disclosed embodiments. At step 580, processing unit 110 may determine navigation information associated with a leading vehicle (e.g., a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above.

At step 582, processing unit 110 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.6 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles' snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time (e.g., 0.5 to 1.5 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2+\delta_x^2)/2/(\delta_x)$, where $\delta_x$ represents the lateral distance traveled and $\delta_z$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle obscures a road polynomial (e.g., the leading vehicle is overlaid on top of the road polynomial), then processing unit 110 may determine that the leading vehicle is likely changing lanes. In the case where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights.

Figure 6:
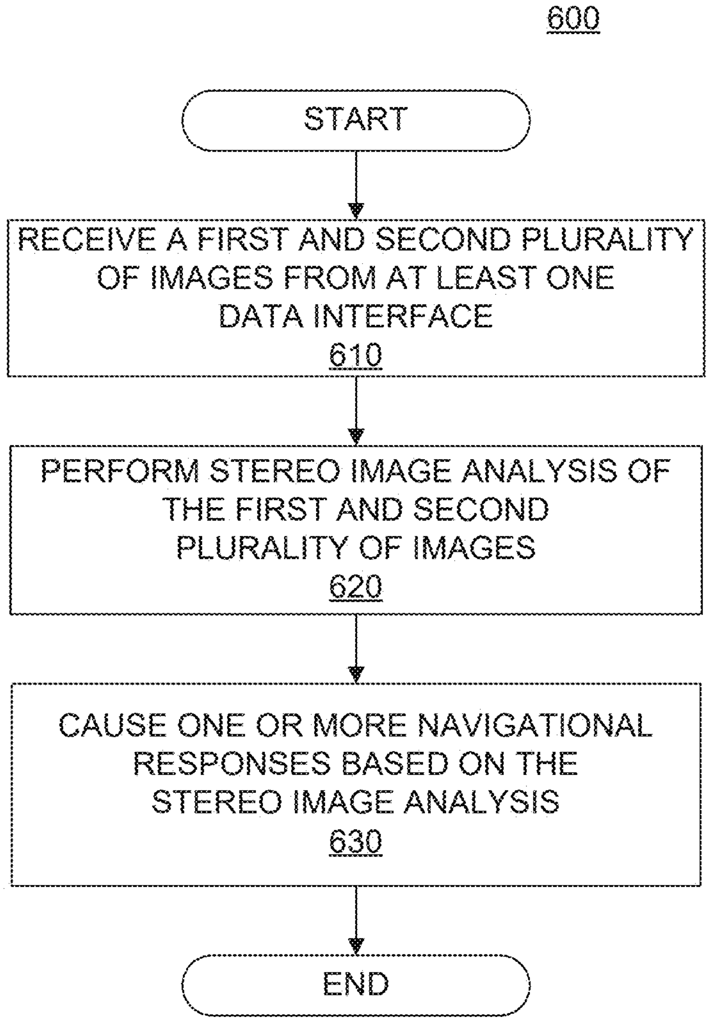
FIG. 6 is a flowchart showing an exemplary process for causing one or more navigational responses based on stereo image analysis consistent with the disclosed embodiments.

FIG. 6 is a flowchart showing an exemplary process 600 for causing one or more navigational responses based on stereo image analysis, consistent with disclosed embodiments. At step 610, processing unit 110 may receive a first and second plurality of images via data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit ramps, traffic lights, road hazards, and the like. Stereo image analysis may be performed in a manner similar to the steps described in connection with FIGS. 5A-5D, above. For example, processing unit 110 may execute stereo image analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may analyze the differences in pixel-level data (or other data subsets from among the two streams of captured images) for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that may exist relative to objects appearing if the two image streams. For example, position, velocity, and/or acceleration relative to vehicle 200 may be determined based on trajectories, positions, movement characteristics, etc. of features associated with an object appearing in one or both of the image streams.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like. In some embodiments, processing unit 110 may use data derived from execution of velocity and acceleration module 406 to cause the one or more navigational responses. Additionally, multiple navigational responses may occur simultaneously, in sequence, or any combination thereof.

Figure 7:
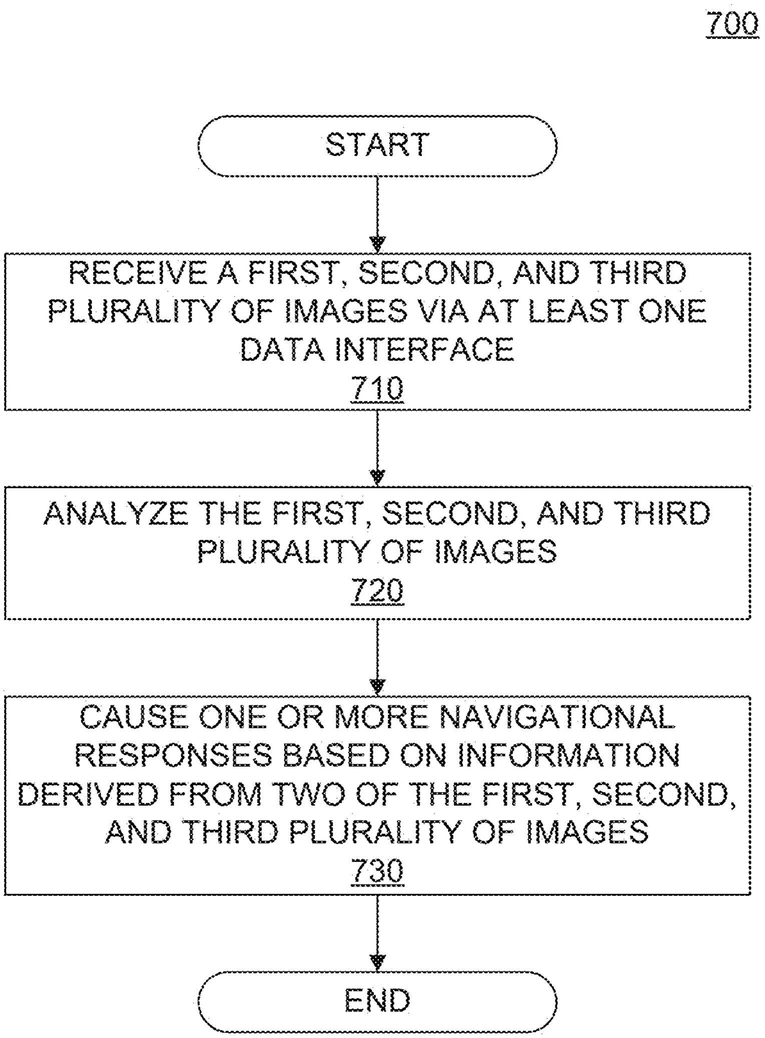
FIG. 7 is a flowchart showing an exemplary process for causing one or more navigational responses based on an analysis of three sets of images consistent with the disclosed embodiments.

FIG. 7 is a flowchart showing an exemplary process 700 for causing one or more navigational responses based on an analysis of three sets of images, consistent with disclosed embodiments. At step 710, processing unit 110 may receive a first, second, and third plurality of images via data interface 128. For instance, cameras included in image acquisition unit 120 (such as image capture devices 122, 124, and 126 having fields of view 202, 204, and 206) may capture a first, second, and third plurality of images of an area forward and/or to the side of vehicle 200 and transmit them over a digital connection (e.g., USB, wireless, Bluetooth, etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D, above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126—including their respective locations and fields of view 202, 204, and 206—may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend on various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments, processing unit 110 may select information derived from two of the first, second, and third plurality of images by determining the extent to which information derived from one image source is consistent with information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Navigational responses may include, for example, a turn, a lane shift, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position, relative velocity, and/or relative acceleration between vehicle 200 and an object detected within any of the first, second, and third plurality of images. Multiple navigational responses may occur simultaneously, in sequence, or any combination thereof.

Analysis of captured images may allow for the generation and use of a sparse map model for autonomous vehicle navigation. In addition, analysis of captured images may allow for the localization of an autonomous vehicle using identified lane markings. Embodiments for detection of particular characteristics based on one or more particular analyses of captured images and for navigation of an autonomous vehicle using a sparse map model will be discussed below.

Sparse Road Model for Autonomous Vehicle Navigation

In some embodiments, the disclosed systems and methods may use a sparse map for autonomous vehicle navigation. In particular, the sparse map may be for autonomous vehicle navigation along a road segment. For example, the sparse map may provide sufficient information for navigating an autonomous vehicle without storing and/or updating a large quantity of data. As discussed below in further detail, an autonomous vehicle may use the sparse map to navigate one or more roads based on one or more stored trajectories.

Sparse Map for Autonomous Vehicle Navigation

In some embodiments, the disclosed systems and methods may generate a sparse map for autonomous vehicle navigation. For example, the sparse map may provide sufficient information for navigation without requiring excessive data storage or data transfer rates. As discussed below in further detail, a vehicle (which may be an autonomous vehicle) may use the sparse map to navigate one or more roads. For example, in some embodiments, the sparse map may include data related to a road and potentially landmarks along the road that may be sufficient for vehicle navigation, but which also exhibit small data footprints. For example, the sparse data maps described in detail below may require significantly less storage space and data transfer bandwidth as compared with digital maps including detailed map information, such as image data collected along a road.

For example, rather than storing detailed representations of a road segment, the sparse data map may store three-dimensional polynomial representations of preferred vehicle paths along a road. These paths may require very little data storage space. Further, in the described sparse data maps, landmarks may be identified and included in the sparse map road model to aid in navigation. These landmarks may be located at any spacing suitable for enabling vehicle navigation, but in some cases, such landmarks need not be identified and included in the model at high densities and short spacings. Rather, in some cases, navigation may be possible based on landmarks that are spaced apart by at least 50 meters, at least 100 meters, at least 500 meters, at least 1 kilometer, or at least 2 kilometers. As will be discussed in more detail in other sections, the sparse map may be generated based on data collected or measured by vehicles equipped with various sensors and devices, such as image capture devices, Global Positioning System sensors, motion sensors, etc., as the vehicles travel along roadways. In some cases, the sparse map may be generated based on data collected during multiple drives of one or more vehicles along a particular roadway. Generating a sparse map using multiple drives of one or more vehicles may be referred to as "crowdsourcing" a sparse map.

Consistent with disclosed embodiments, an autonomous vehicle system may use a sparse map for navigation. For example, the disclosed systems and methods may distribute a sparse map for generating a road navigation model for an autonomous vehicle and may navigate an autonomous vehicle along a road segment using a sparse map and/or a generated road navigation model. Sparse maps consistent with the present disclosure may include one or more three-dimensional contours that may represent predetermined trajectories that autonomous vehicles may traverse as they move along associated road segments.

Sparse maps consistent with the present disclosure may also include data representing one or more road features. Such road features may include recognized landmarks, road signature profiles, and any other road-related features useful in navigating a vehicle. Sparse maps consistent with the present disclosure may enable autonomous navigation of a vehicle based on relatively small amounts of data included in the sparse map. For example, rather than including detailed representations of a road, such as road edges, road curvature, images associated with road segments, or data detailing other physical features associated with a road segment, the disclosed embodiments of the sparse map may require relatively little storage space (and relatively little bandwidth when portions of the sparse map are transferred to a vehicle) but may still adequately provide for autonomous vehicle navigation. The small data footprint of the disclosed sparse maps, discussed in further detail below, may be achieved in some embodiments by storing representations of road-related elements that require small amounts of data but still enable autonomous navigation.

For example, rather than storing detailed representations of various aspects of a road, the disclosed sparse maps may store polynomial representations of one or more trajectories that a vehicle may follow along the road. Thus, rather than storing (or having to transfer) details regarding the physical nature of the road to enable navigation along the road, using the disclosed sparse maps, a vehicle may be navigated along a particular road segment without, in some cases, having to interpret physical aspects of the road, but rather, by aligning its path of travel with a trajectory (e.g., a polynomial spline) along the particular road segment. In this way, the vehicle may be navigated based mainly upon the stored trajectory (e.g., a polynomial spline) that may require much less storage space than an approach involving storage of roadway images, road parameters, road layout, etc.

In addition to the stored polynomial representations of trajectories along a road segment, the disclosed sparse maps may also include small data objects that may represent a road feature. In some embodiments, the small data objects may include digital signatures, which are derived from a digital image (or a digital signal) that was obtained by a sensor (e.g., a camera or other sensor, such as a suspension sensor) onboard a vehicle traveling along the road segment. The digital signature may have a reduced size relative to the signal that was acquired by the sensor. In some embodiments, the digital signature may be created to be compatible with a classifier function that is configured to detect and to identify the road feature from the signal that is acquired by the sensor, for example, during a subsequent drive. In some embodiments, a digital signature may be created such that the digital signature has a footprint that is as small as possible, while retaining the ability to correlate or match the road feature with the stored signature based on an image (or a digital signal generated by a sensor, if the stored signature is not based on an image and/or includes other data) of the road feature that is captured by a camera onboard a vehicle traveling along the same road segment at a subsequent time.

In some embodiments, a size of the data objects may be further associated with a uniqueness of the road feature. For example, for a road feature that is detectable by a camera onboard a vehicle, and where the camera system onboard the vehicle is coupled to a classifier that is capable of distinguishing the image data corresponding to that road feature as being associated with a particular type of road feature, for example, a road sign, and where such a road sign is locally unique in that area (e.g., there is no identical road sign or road sign of the same type nearby), it may be sufficient to store data indicating the type of the road feature and its location.

As will be discussed in further detail below, road features (e.g., landmarks along a road segment) may be stored as small data objects that may represent a road feature in relatively few bytes, while at the same time providing sufficient information for recognizing and using such a feature for navigation. In one example, a road sign may be identified as a recognized landmark on which navigation of a vehicle may be based. A representation of the road sign may be stored in the sparse map to include, e.g., a few bytes of data indicating a type of landmark (e.g., a stop sign) and a few bytes of data indicating a location of the landmark (e.g., coordinates). Navigating based on such data-light representations of the landmarks (e.g., using representations sufficient for locating, recognizing, and navigating based upon the landmarks) may provide a desired level of navigational functionality associated with sparse maps without significantly increasing the data overhead associated with the sparse maps. This lean representation of landmarks (and other road features) may take advantage of the sensors and processors included onboard such vehicles that are configured to detect, identify, and/or classify certain road features.

When, for example, a sign or even a particular type of a sign is locally unique (e.g., when there is no other sign or no other sign of the same type) in a given area, the sparse map may use data indicating a type of a landmark (a sign or a specific type of sign), and during navigation (e.g., autonomous navigation) when a camera onboard an autonomous vehicle captures an image of the area including a sign (or of a specific type of sign), the processor may process the image, detect the sign (if indeed present in the image), classify the image as a sign (or as a specific type of sign), and correlate the location of the image with the location of the sign as stored in the sparse map.

Road Feature Representation

In some embodiments, a sparse map may include at least one line representation of a road surface feature extending along a road segment and a plurality of landmarks associated with the road segment. In certain aspects, the sparse map may be generated via "crowdsourcing," for example, through image analysis of a plurality of images acquired as one or more vehicles traverse the road segment.

Figure 8A:
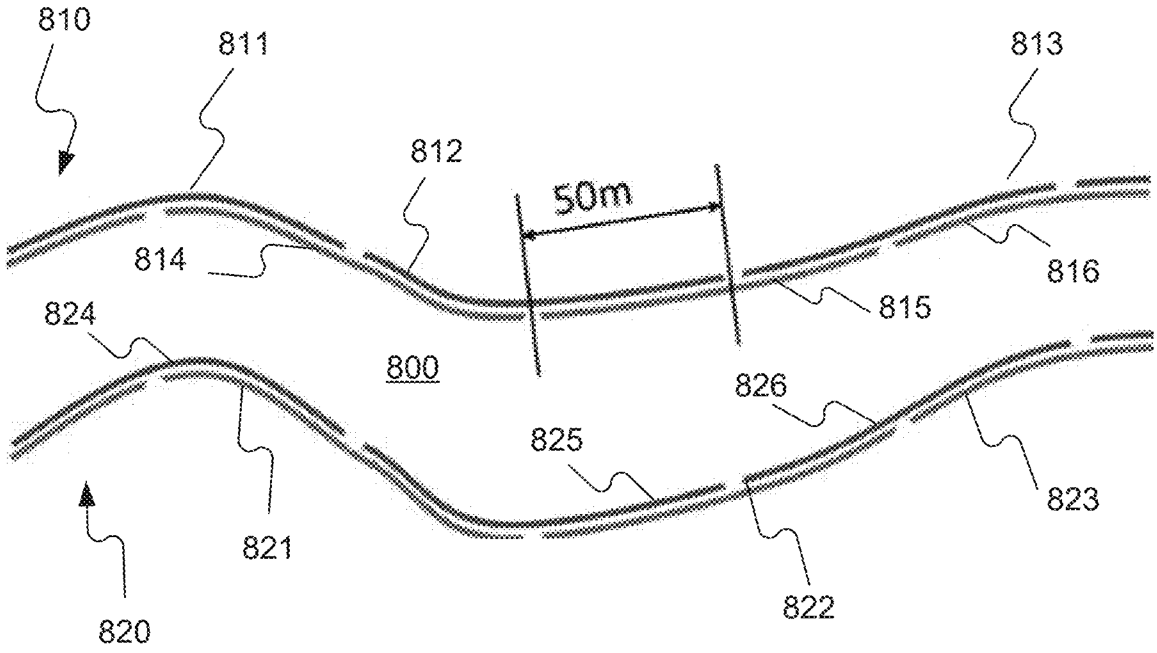
FIG. 8A illustrates a polynomial representation of a portions of a road segment consistent with the disclosed embodiments.
Figure 9A:
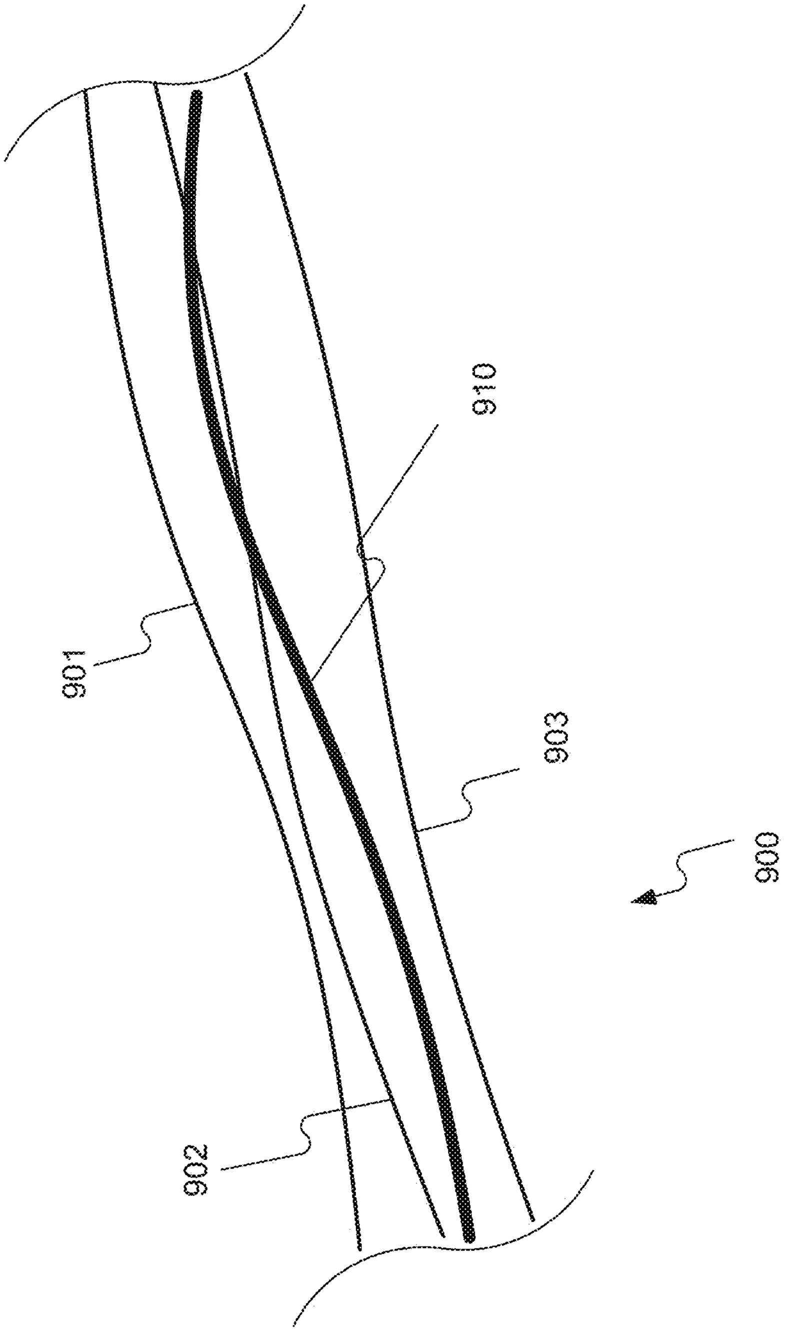
FIG. 9A shows polynomial representations of trajectories consistent with the disclosed embodiments.

In addition to target trajectories and identified landmarks, a sparse may include information relating to various other road features. For example, FIG. 9A illustrates a representation of curves along a particular road segment that may be stored in a sparse map. In some embodiments, a single lane of a road may be modeled by a three-dimensional polynomial description of left and right sides of the road. Such polynomials representing left and right sides of a single lane are shown in FIG. 8A. Regardless of how many lanes a road may have, the road may be represented using polynomials in a way similar to that illustrated in FIG. 8A. For example, left and right sides of a multi-lane road may be represented by polynomials similar to those shown in FIG. 8A, and intermediate lane markings included on a multi-lane road (e.g., dashed markings representing lane boundaries, solid yellow lines representing boundaries between lanes traveling in different directions, etc.) may also be represented using polynomials such as those shown in FIG. 8A.

As shown in FIG. 8A, a lane 800 may be represented using polynomials (e.g., a first order, second order, third order, or any suitable order polynomials). For illustration, lane 800 is shown as a two-dimensional lane and the polynomials are shown as two-dimensional polynomials. As depicted in FIG. 8A, lane 800 includes a left side 810 and a right side 820. In some embodiments, more than one polynomial may be used to represent a location of each side of the road or lane boundary. For example, each of left side 810 and right side 820 may be represented by a plurality of polynomials of any suitable length. In some cases, the polynomials may have a length of about 100 m, although other lengths greater than or less than 100 m may also be used. Additionally, the polynomials can overlap with one another in order to facilitate seamless transitions in navigating based on subsequently encountered polynomials as a host vehicle travels along a roadway. For example, each of left side 810 and right side 820 may be represented by a plurality of third order polynomials separated into segments of about 100 meters in length (an example of the first predetermined range), and overlapping each other by about 50 meters. The polynomials representing the left side 810 and the right side 820 may or may not have the same order. For example, in some embodiments, some polynomials may be second order polynomials, some may be third order polynomials, and some may be fourth order polynomials.

In the example shown in FIG. 8A, left side 810 of lane 800 is represented by two groups of third order polynomials. The first group includes polynomial segments 811, 812, and 813.

The second group includes polynomial segments 814, 815, and 816. The two groups, while substantially parallel to each other, follow the locations of their respective sides of the road. Polynomial segments 811, 812, 813, 814, 815, and 816 have a length of about 100 meters and overlap adjacent segments in the series by about 50 meters. As noted previously, however, polynomials of different lengths and different overlap amounts may also be used. For example, the polynomials may have lengths of 500 m, 1 km, or more, and the overlap amount may vary from 0 to 50 m, 50 m to 100 m, or greater than 100 m. Additionally, while FIG. 8A is shown as representing polynomials extending in 2D space (e.g., on the surface of the paper), it is to be understood that these polynomials may represent curves extending in three dimensions (e.g., including a height component) to represent elevation changes in a road segment in addition to X-Y curvature. In the example shown in FIG. 8A, right side 820 of lane 800 is further represented by a first group having polynomial segments 821, 822, and 823 and a second group having polynomial segments 824, 825, and 826.

Figure 8B:
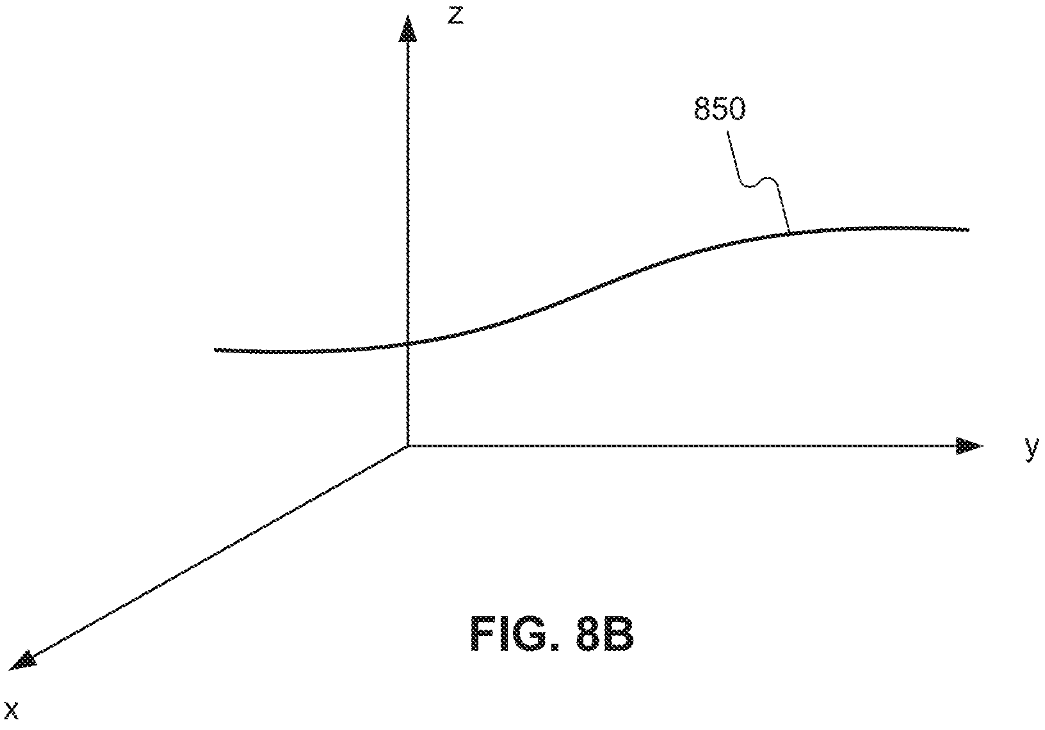
FIG. 8B illustrates a curve in three-dimensional space representing a target trajectory of a vehicle, for a particular road segment, included in a sparse map consistent with the disclosed embodiments.

Returning to the target trajectories of a sparse map, FIG. 8B shows a three-dimensional polynomial representing a target trajectory for a vehicle traveling along a particular road segment. The target trajectory represents not only the X-Y path that a host vehicle should travel along a particular road segment, but also the elevation change that the host vehicle will experience when traveling along the road segment. Thus, each target trajectory in a sparse map may be represented by one or more three-dimensional polynomials, like the three-dimensional polynomial 850 shown in FIG. 8B. A sparse map may include a plurality of trajectories (e.g., millions or billions or more to represent trajectories of vehicles along various road segments along roadways throughout the world). In some embodiments, each target trajectory may correspond to a spline connecting three-dimensional polynomial segments.

Regarding the data footprint of polynomial curves stored in a sparse map, in some embodiments, each third degree polynomial may be represented by four parameters, each requiring four bytes of data. Suitable representations may be obtained with third degree polynomials requiring about 192 bytes of data for every 100 m. This may translate to approximately 200 kB per hour in data usage/transfer requirements for a host vehicle traveling approximately 100 km/hr.

A sparse map may describe the lanes network using a combination of geometry descriptors and meta-data. The geometry may be described by polynomials or splines as described above. The meta-data may describe the number of lanes, special characteristics (such as a car pool lane), and possibly other sparse labels. The total footprint of such indicators may be negligible.

Accordingly, a sparse map according to embodiments of the present disclosure may include at least one line representation of a road surface feature extending along the road segment, each line representation representing a path along the road segment substantially corresponding with the road surface feature. In some embodiments, as discussed above, the at least one line representation of the road surface feature may include a spline, a polynomial representation, or a curve. Furthermore, in some embodiments, the road surface feature may include at least one of a road edge or a lane marking. Moreover, as discussed below with respect to "crowdsourcing," the road surface feature may be identified through image analysis of a plurality of images acquired as one or more vehicles traverse the road segment.

FIG. 9A shows polynomial representations of trajectories captured during a process of building or maintaining a sparse map. A polynomial representation of a target trajectory included in a sparse map may be determined based on two or more reconstructed trajectories of prior traversals of vehicles along the same road segment. In some embodiments, the polynomial representation of the target trajectory included in a sparse map may be an aggregation of two or more reconstructed trajectories of prior traversals of vehicles along the same road segment. In some embodiments, the polynomial representation of the target trajectory included in a sparse map may be an average of the two or more reconstructed trajectories of prior traversals of vehicles along the same road segment. Other mathematical operations may also be used to construct a target trajectory along a road path based on reconstructed trajectories collected from vehicles traversing along a road segment.

As shown in FIG. 9A, a road segment 900 may be travelled by a number of vehicles 200 at different times. Each vehicle 200 may collect data relating to a path that the vehicle took along the road segment. The path traveled by a particular vehicle may be determined based on camera data, accelerometer information, speed sensor information, and/or GPS information, among other potential sources. Such data may be used to reconstruct trajectories of vehicles traveling along the road segment, and based on these reconstructed trajectories, a target trajectory (or multiple target trajectories) may be determined for the particular road segment. Such target trajectories may represent a preferred path of a host vehicle (e.g., guided by an autonomous navigation system) as the vehicle travels along the road segment.

In the example shown in FIG. 9A, a first reconstructed trajectory 901 may be determined based on data received from a first vehicle traversing road segment 900 at a first time period (e.g., day 1), a second reconstructed trajectory 902 may be obtained from a second vehicle traversing road segment 900 at a second time period (e.g., day 2), and a third reconstructed trajectory 903 may be obtained from a third vehicle traversing road segment 900 at a third time period (e.g., day 3). Each trajectory 901, 902, and 903 may be represented by a polynomial, such as a three-dimensional polynomial. It should be noted that in some embodiments, any of the reconstructed trajectories may be assembled onboard the vehicles traversing road segment 900.

Additionally, or alternatively, such reconstructed trajectories may be determined on a server side based on information received from vehicles traversing road segment 900. For example, in some embodiments, vehicles 200 may transmit data to one or more servers relating to their motion along road segment 900 (e.g., steering angle, heading, time, position, speed, sensed road geometry, and/or sensed landmarks, among things). The server may reconstruct trajectories for vehicles 200 based on the received data. The server may also generate a target trajectory for guiding navigation of autonomous vehicle that will travel along the same road segment 900 at a later time based on the first, second, and third trajectories 901, 902, and 903. While a target trajectory may be associated with a single prior traversal of a road segment, in some embodiments, each target trajectory included in a sparse map may be determined based on two or more reconstructed trajectories of vehicles traversing the same road segment. In FIG. 9A, the target trajectory is represented by 910. In some embodiments, the target trajectory 910 may be generated based on an average of the first, second, and third trajectories 901, 902, and 903. In some embodiments, the target trajectory 910 included in a sparse map may be an aggregation (e.g., a weighted combination) of two or more reconstructed trajectories. Aligning drive data to construct trajectories is further discussed below with respect to FIG. 29.

Figure 9B:
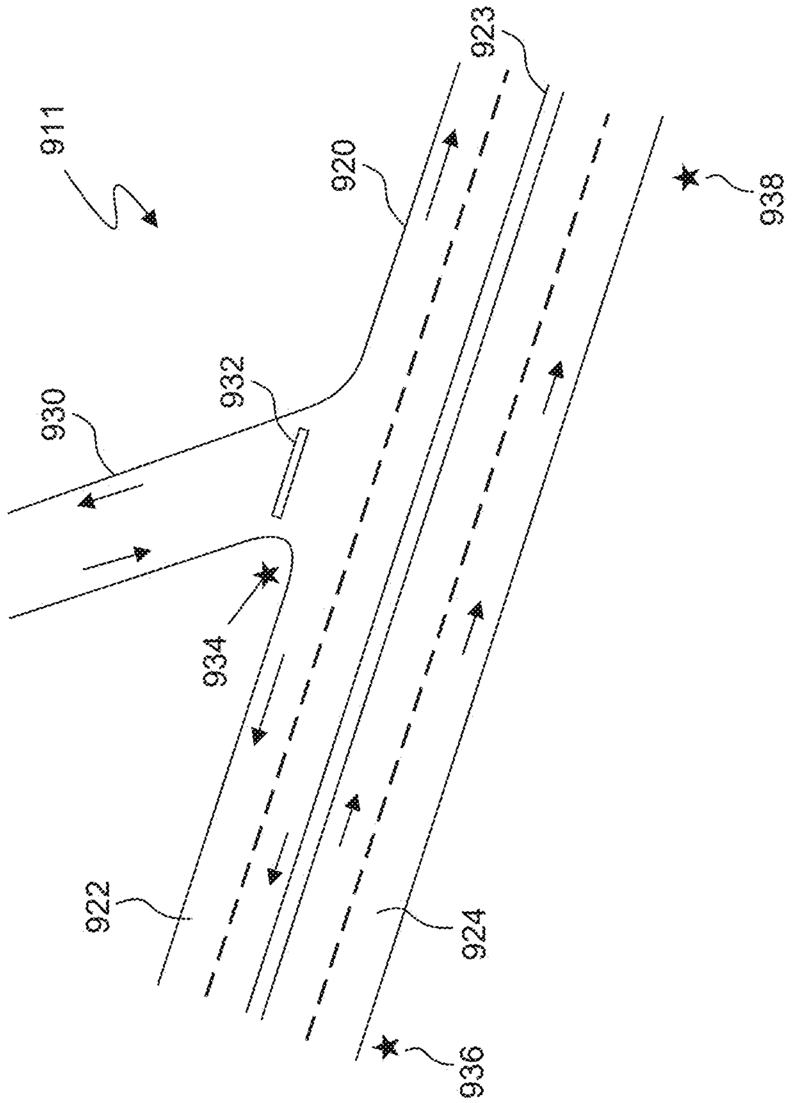
FIGS. 9B and 9C show target trajectories along a multi-lane road consistent with disclosed embodiments.
Figure 9C:
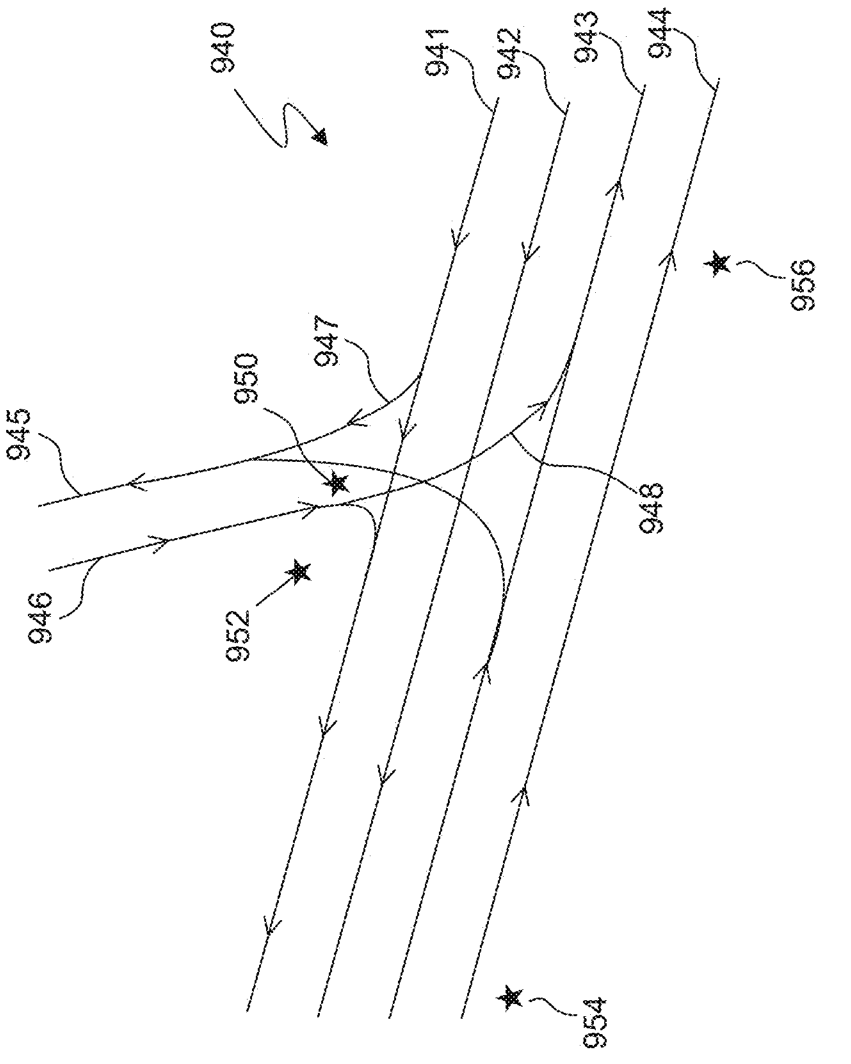

FIGS. 9B and 9C further illustrate the concept of target trajectories associated with road segments present within a geographic region 911. As shown in FIG. 9B, a first road segment 920 within geographic region 911 may include a multilane road, which includes two lanes 922 designated for vehicle travel in a first direction and two additional lanes 924 designated for vehicle travel in a second direction opposite to the first direction. Lanes 922 and lanes 924 may be separated by a double yellow line 923. Geographic region 911 may also include a branching road segment 930 that intersects with road segment 920. Road segment 930 may include a two-lane road, each lane being designated for a different direction of travel. Geographic region 911 may also include other road features, such as a stop line 932, a stop sign 934, a speed limit sign 936, and a hazard sign 938.

As shown in FIG. 9C, a sparse map may include a local map 940 including a road model for assisting with autonomous navigation of vehicles within geographic region 911. For example, local map 940 may include target trajectories for one or more lanes associated with road segments 920 and/or 930 within geographic region 911. For example, local map 940 may include target trajectories 941 and/or 942 that an autonomous vehicle may access or rely upon when traversing lanes 922. Similarly, local map 940 may include target trajectories 943 and/or 944 that an autonomous vehicle may access or rely upon when traversing lanes 924. Further, local map 940 may include target trajectories 945 and/or 946 that an autonomous vehicle may access or rely upon when traversing road segment 930. Target trajectory 947 represents a preferred path an autonomous vehicle should follow when transitioning from lanes 920 (and specifically, relative to target trajectory 941 associated with a right-most lane of lanes 920) to road segment 930 (and specifically, relative to a target trajectory 945 associated with a first side of road segment 930. Similarly, target trajectory 948 represents a preferred path an autonomous vehicle should follow when transitioning from road segment 930 (and specifically, relative to target trajectory 946) to a portion of road segment 924 (and specifically, as shown, relative to a target trajectory 943 associated with a left lane of lanes 924.

A sparse map may also include representations of other road-related features associated with geographic region 911. For example, a sparse map may also include representations of one or more landmarks identified in geographic region 911. Such landmarks may include a first landmark 950 associated with stop line 932, a second landmark 952 associated with stop sign 934, a third landmark associated with speed limit sign 954, and a fourth landmark 956 associated with hazard sign 938. Such landmarks may be used, for example, to assist an autonomous vehicle in determining its current location relative to any of the shown target trajectories, such that the vehicle may adjust its heading to match a direction of the target trajectory at the determined location.

Figure 9D:
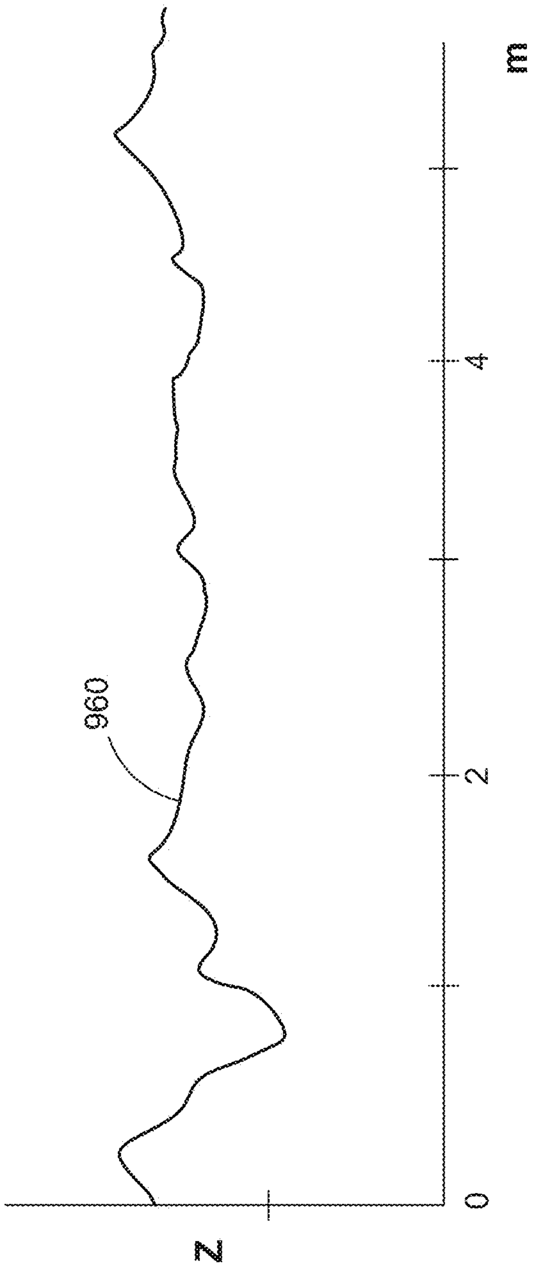
FIG. 9D shows an example road signature profile consistent with disclosed embodiments.

In some embodiments, a sparse map may also include road signature profiles. Such road signature profiles may be associated with any discernible/measurable variation in at least one parameter associated with a road. For example, in some cases, such profiles may be associated with variations in road surface information such as variations in surface roughness of a particular road segment, variations in road width over a particular road segment, variations in distances between dashed lines painted along a particular road segment, variations in road curvature along a particular road segment, etc. FIG. 9D shows an example of a road signature profile 960. While profile 960 may represent any of the parameters mentioned above, or others, in one example, profile 960 may represent a measure of road surface roughness, as obtained, for example, by monitoring one or more sensors providing outputs indicative of an amount of suspension displacement as a vehicle travels a particular road segment.

Alternatively or concurrently, profile 960 may represent variation in road width, as determined based on image data obtained via a camera onboard a vehicle traveling a particular road segment. Such profiles may be useful, for example, in determining a particular location of an autonomous vehicle relative to a particular target trajectory. That is, as it traverses a road segment, an autonomous vehicle may measure a profile associated with one or more parameters associated with the road segment. If the measured profile can be correlated/matched with a predetermined profile that plots the parameter variation with respect to position along the road segment, then the measured and predetermined profiles may be used (e.g., by overlaying corresponding sections of the measured and predetermined profiles) in order to determine a current position along the road segment and, therefore, a current position relative to a target trajectory for the road segment.

In some embodiments, a sparse map may include different trajectories based on different characteristics associated with a user of autonomous vehicles, environmental conditions, and/or other parameters relating to driving. For example, in some embodiments, different trajectories may be generated based on different user preferences and/or profiles. A sparse map including such different trajectories may be provided to different autonomous vehicles of different users. For example, some users may prefer to avoid toll roads, while others may prefer to take the shortest or fastest routes, regardless of whether there is a toll road on the route. The disclosed systems may generate different sparse maps with different trajectories based on such different user preferences or profiles. As another example, some users may prefer to travel in a fast moving lane, while others may prefer to maintain a position in the central lane at all times.

Different trajectories may be generated and included in a sparse map based on different environmental conditions, such as day and night, snow, rain, fog, etc. Autonomous vehicles driving under different environmental conditions may be provided with a sparse map generated based on such different environmental conditions. In some embodiments, cameras provided on autonomous vehicles may detect the environmental conditions, and may provide such information back to a server that generates and provides sparse maps. For example, the server may generate or update an already generated a sparse map to include trajectories that may be more suitable or safer for autonomous driving under the detected environmental conditions. The update of a sparse map based on environmental conditions may be performed dynamically as the autonomous vehicles are traveling along roads.

Other different parameters relating to driving may also be used as a basis for generating and providing different sparse maps to different autonomous vehicles. For example, when an autonomous vehicle is traveling at a high speed, turns may be tighter. Trajectories associated with specific lanes, rather than roads, may be included in a sparse map such that the autonomous vehicle may maintain within a specific lane as the vehicle follows a specific trajectory. When an image captured by a camera onboard the autonomous vehicle indicates that the vehicle has drifted outside of the lane (e.g., crossed the lane mark), an action may be triggered within the vehicle to bring the vehicle back to the designated lane according to the specific trajectory.

Figure 10:
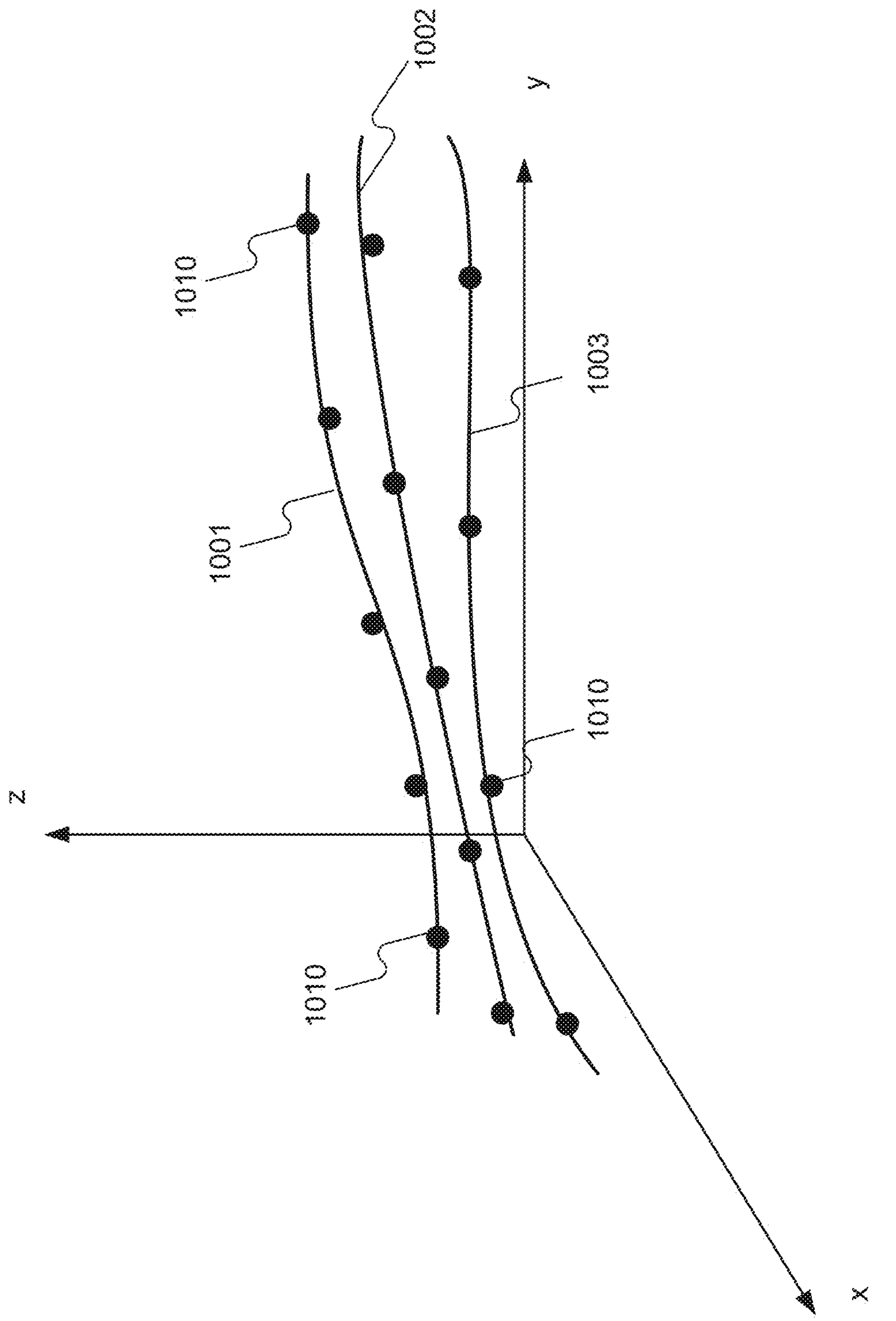
FIG. 10 illustrates an example autonomous vehicle road navigation model represented by a plurality of three-dimensional splines, consistent with the disclosed embodiments.

FIG. 10 illustrates an example autonomous vehicle road navigation model represented by a plurality of three dimensional splines 1001, 1002, and 1003. The curves 1001, 1002, and 1003 shown in FIG. 10 are for illustration purpose only. Each spline may include one or more three dimensional polynomials connecting a plurality of data points 1010. Each polynomial may be a first order polynomial, a second order polynomial, a third order polynomial, or a combination of any suitable polynomials having different orders. Each data point 1010 may be associated with the navigation information received from a plurality of vehicles. In some embodiments, each data point 1010 may be associated with data related to landmarks (e.g., size, location, and identification information of landmarks) and/or road signature profiles (e.g., road geometry, road roughness profile, road curvature profile, road width profile). In some embodiments, some data points 1010 may be associated with data related to landmarks, and others may be associated with data related to road signature profiles.

Figure 11:
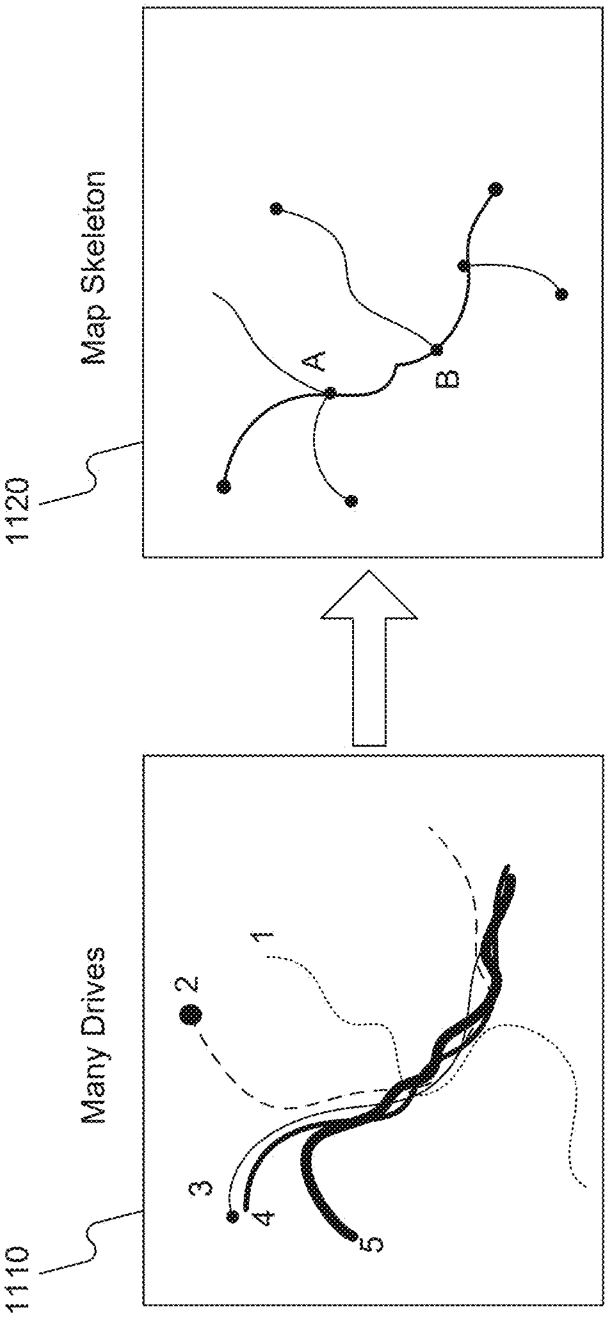
FIG. 11 shows a map skeleton generated from combining location information from many drives, consistent with the disclosed embodiments.

FIG. 11 illustrates raw location data 1110 (e.g., GPS data) received from five separate drives. One drive may be separate from another drive if it was traversed by separate vehicles at the same time, by the same vehicle at separate times, or by separate vehicles at separate times. To account for errors in the location data 1110 and for differing locations of vehicles within the same lane (e.g., one vehicle may drive closer to the left of a lane than another), a remote server may generate a map skeleton 1120 using one or more statistical techniques to determine whether variations in the raw location data 1110 represent actual divergences or statistical errors. Each path within skeleton 1120 may be linked back to the raw data 1110 that formed the path. For example, the path between A and B within skeleton 1120 is linked to raw data 1110 from drives 2, 3, 4, and 5 but not from drive 1. Skeleton 1120 may not be detailed enough to be used to navigate a vehicle (e.g., because it combines drives from multiple lanes on the same road unlike the splines described above) but may provide useful topological information and may be used to define intersections.

Identifying Vehicle Wheel Slips

The present disclosure describes a navigation system for a host vehicle configured to use image analysis and measurements of wheel rotation to detect a wheel condition. Thereafter, the navigation system may initiate at least one navigational action associated with the detected wheel condition. In some embodiments, the detected wheel condition may be indicative that one or more of the wheels of the vehicle have slipped or locked relative to the vehicle's chassis. For example, detection results may indicate that at least one wheel had a lateral slip or a longitudinal slip. In some embodiments, the detected wheel condition may be indicative of an anomalous behavior or a fault of at least one mechanical component of the host vehicle. For example, detection results may indicate that a tire has started to leak or has become flat. In some embodiments, the system may harvest crowdsourced information about wheel slip conditions that have been collected from multiple host vehicles to update map information with locations of potential hazards. For example, the disclosed systems and methods may use crowdsourced information to update a map with locations of one or more areas with slippery conditions due to, for example, wet or icy roads.

In a conventional system, wheel rotation is typically determined based on input from wheel speed sensors (which are a type of tachometers) or estimated based on revolutions per minute (RPMs) sensors of the wheel. However, using information provided by wheel speed sensors, such as wheel ticks, is limited when determining current traction conditions of each wheel separately. Moreover, determining traction conditions using RPMs, which is based on wheel circumference, is susceptible to errors since RPMs may vary as tire air pressure varies from temperature changes. Other options for determining wheel rotation are also prone to drawbacks. For example, one alternative solution is to include an inertial sensor in the vehicle, but such sensors are cost prohibitive. Another alternative solution is using a MEMS (micro-electromechanical system) sensor, but MEMS sensors are difficult to calibrate. Using a global positioning system (GPS) is also not a suitable alternative to determine accurate wheel rotation measurements of, as GPS provides a vehicle's position within an accuracy of meters. Thus, solutions are needed to determine wheel rotation that are more accurate and cost effective than these conventional techniques.

Consistent with embodiments of the present disclosure, the disclosed systems and methods may use a high-fidelity vision-based movement model to predict wheel rotation using the vehicle's ego motion. These predictions may be compared to measured wheel rotation signals so any anomalies can be detected, reported, and used by a vehicle's control system. Prior systems are unable to confirm the validity of physical measurements of wheel rotation. In contrast, the disclosed systems and methods may determine confidence levels for physical measurements of wheel rotation. For example, the disclosed systems and methods may make a separate determination of a predicted wheel rotation by using vision systems (e.g., image analysis) to independently verify the physical measurements of wheel rotation and/or to make supplemental determinations. Accordingly, the disclosed systems and methods may provide significant performance improvements to various vehicle control systems. For example, automatic braking systems, traction control systems, and electronic stability control systems may provide some level of autonomous control of certain systems of the vehicle to enhance the performance of the vehicle during wheel slip conditions. Currently, these systems rely primarily on sensor outputs that provide wheel speed signals, but do not have access to any sensor systems whose output is representative of the actual vehicle ego-motion. The disclosed systems and methods may bridge this gap and significantly enhance vehicle performance.

The disclosed systems and methods may detect any slipping or locking of each of the wheels of a vehicle separately. Such detection results may improve low-level control logic of safety systems. For example, quickly identifying loss of braking power in each wheel separately may improve antilock braking system (ABS) performance; detecting both lateral and longitudinal slip, along with the actual relative motion of the wheel, may improve electric power steering (EPS) performance; and being able to determine the actual relative motion of each wheel and address alternating surface slippery properties (e.g., movement on puddles\snow patches) may provide traction control system (TCS) performance. Additional applications for the disclosed systems and methods may include improved advanced sport support, improved harsh road condition support, and/or improved passenger comfort support. For example, a vehicle equipped with the disclosed system may detect a slight slip condition on all the wheels for several output cycles. If a different detection result also implies the vehicle is still on the road, it can be deduced that the vehicle encountered a slippery road patch rather than a deviation from the road or dynamic maneuver. The vehicle may then apply a cautious driving policy. Moreover, when using a sport mode, a driver may make rough turns at the expense of comfortable driving. In such situations, it is nevertheless important to maintain steering and safety properties. By using the disclosed system, vehicle traction may be optimized during rapid accelerations and even while intentionally skid-turning. Additional applications for the disclosed systems and methods may include detecting anomalous behavior and misalignment of a vehicle's mechanical structures, such as the wheels' differential or other components along the drive train, and detecting erroneous tire pressure levels. For example, if a vehicle's differential works properly, there should be an agreement between the ratio of the wheels' rotation rate difference (inner and outer radius turn) and the turn's radius and rate when the driver takes a controlled turn. The disclosed systems and methods may detect anomalies in this relationship to determine that the differential is not working properly. In another example, if a tire has low pressure levels, the relationship between the rotation rate and the vehicle's movement will change. The disclosed systems and methods may detect this discrepancy and provide an indication of a flat or low tire pressure. Alternatively, the disclosed systems and methods may report these and other anomalies to the vehicle's computer for drive management and/or make such analysis results available to service and maintenance providers.

Figure 12:
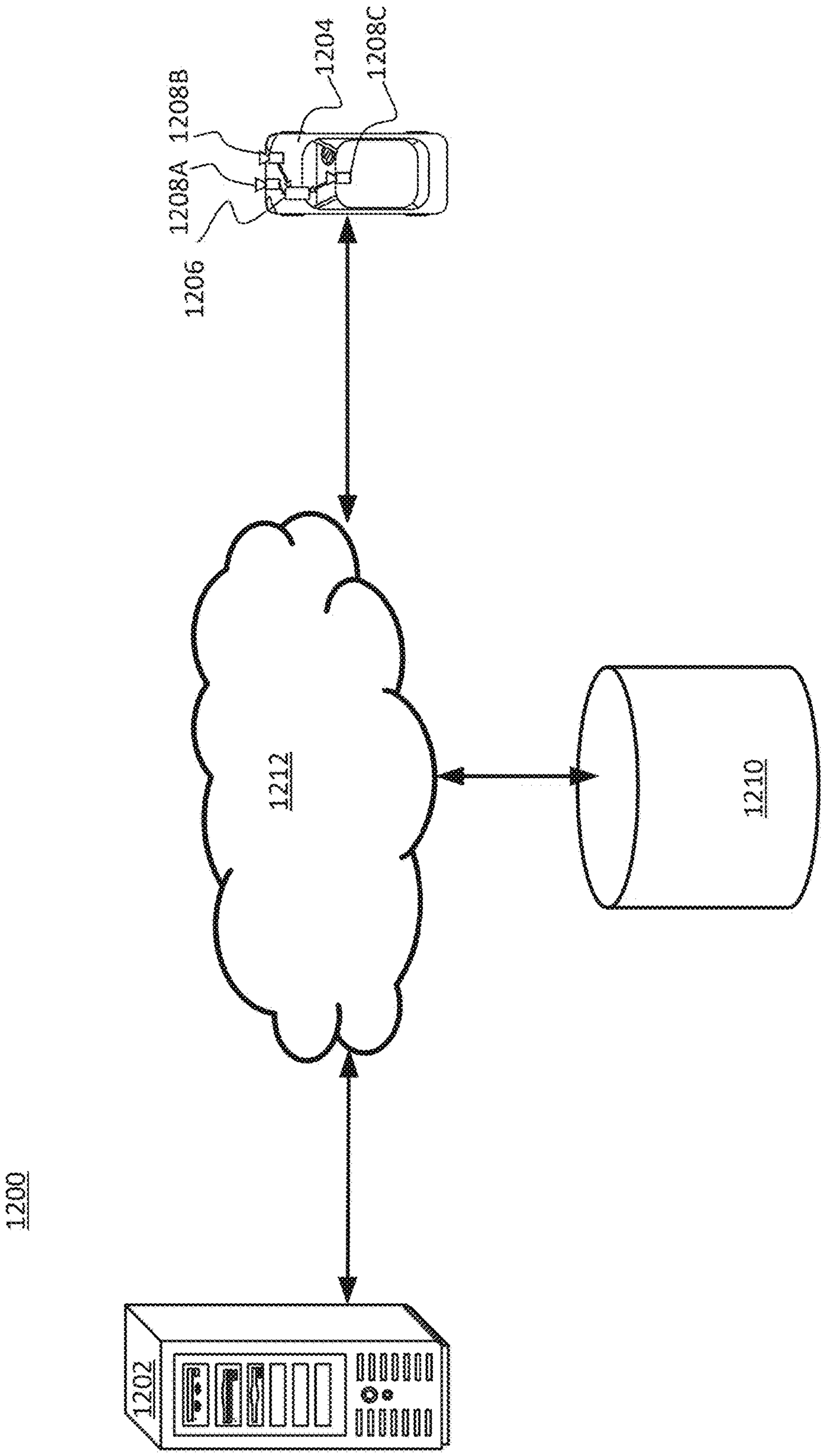
FIG. 12 is a diagrammatic representation of an exemplary system consistent with the disclosed embodiments.

FIG. 12 is a diagrammatic representation of an exemplary navigation system 1200 consistent with the disclosed embodiments. Navigation system 1200 may include a server 1202, at least one host vehicle 1204 with a processing unit 1206 and one or more cameras 1208 (e.g., a first camera 1208A, a second camera 1208B, and a third camera 1208C), a database 1210, and a network 1212. Server 1202 may be configured to provide information to host vehicle 1204. For example, server 1202 may be configured to transmit to processing unit 1206 map data including information relating to the roads in the area of host vehicle 1204, and may receive from processing unit 1206 indicators of detected wheel slip conditions of host vehicle 1204. Processing unit 1206 may be configured to process images captured by one or more cameras 1208 in order to determine a motion of host vehicle 1204, detect wheel slip conditions, and operate one or more components of host vehicle 1204 (such as a steering mechanism, braking mechanism, or various other components). Database 1210 may be configured to store information for the components of system 1200 (e.g., server 1202, host vehicle 1204, and/or cameras 1208). Network 1212 may be configured to facilitate communications among the components of system 1200.

In some embodiments, server 1202 may be a cloud server that performs the functions disclosed herein. The term "cloud server" refers to a computer platform that provides services via a network, such as the Internet. In this example configuration, server 1202 may use virtual machines that may not correspond to individual hardware. For example, computational and/or storage capabilities may be implemented by allocating appropriate portions of desired computation/storage power from a scalable repository, such as a data center or a distributed computing environment. In one example, server 1202 may implement the methods described herein using customized hard-wired logic, one or more Application Specific Integrated Circuits (ASICs) or Field Programmable Gate Arrays (FPGAs), firmware, and/or program logic which, in combination with the computer system, cause server 1202 to be a special-purpose machine.

Host vehicle 1204 may include one or more components, such as a steering mechanism, braking mechanism, or various other components to implement various navigational actions. Host vehicle 1204 may be similar to vehicles discussed above (e.g., vehicle 200), and may include components or devices included in or associated with the vehicles discussed above. Host vehicle 1204 may communicate with server 1202 via one or more networks (e.g., over a cellular network and/or the Internet, etc.). In one embodiment, host vehicle 1204 may transmit data to server 1202 and receive data from server 1202. For example, host vehicle 1204 may transmit image data to server 1202. The image data may include pixel data streams, digital images, digital video streams, data derived from captured images, and data that may be used to construct a 3D image. Additionally or alternatively, host vehicle 1204 may receive map data (e.g., data from map database 160) from server 1202 with an identification of the existence of slippery, icy, or other adverse conditions detected relative to a particular road segment.

Processing unit 1206 may include at least one processor comprising circuitry and a memory, wherein the memory includes instructions that when executed by the circuitry cause the at least one processor to perform the methods disclosed herein. For example, the at least one processor may execute the instructions to analyze the motion of host vehicle 1204 across at least two images captured by camera 1208 to determine how much host vehicle 1204 has moved (and thus how much a wheel of host vehicle 1204 has moved) from one image frame to a subsequent image frame. In some embodiments, processing unit 1206 may use information about the size of imaged objects in the environment of host vehicle 1204 to determine a motion of host vehicle 1204 and to predict wheel rotation. Thereafter, processing unit 1206 may receive one or more sensor outputs indicative of measured wheel rotation and compare the predicted wheel rotation to the measured wheel rotation. In other words, processing unit 1206 may combine (or fuse) the output or results of the image-based analysis with the output of another vehicle system that estimates wheel movement (e.g., an RPM calculator, an inertial sensor, a MEMS device, etc.) to detect a wheel slip condition or a fault condition associated with a wheel of host vehicle 1204. Processing unit 1206 may be similar to other processing units disclosed in this disclosure (e.g., processing unit 110).

Each of the one or more cameras 1208 may include at least one image capture device (e.g., image capture device 122, image capture device 124, and image capture device 126) associated with host vehicle 1204 and configured to capture one or more images representing the environment of host vehicle 1204. The one or more cameras 1208 may be configured to convey the acquired images to one or more components of navigation system 1200 (e.g., processing unit 1206, server 1202, and/or database 1210). In some embodiments, a plurality of cameras 1208 may include two more cameras configured to capture images representing the environment of host vehicle 1204. In some embodiments, the plurality of cameras 1208 may be the same type of cameras but with differing field of views. Alternatively, at least two of the plurality of cameras 1208 may be different (e.g., having different focal lengths, having different operational parameters, or the like, or a combination thereof). For example, the plurality of cameras 1208 may include five cameras. In one example arrangement, the first camera may be a camera having a fisheye lens, the second camera may be a camera having a telephoto lens, and the third camera may be a middle (or main) camera with a normal lens (e.g., having a focal length equal to 50 mm). Each of the first, second, and third camera may have a field of view facing a middle, front of the vehicle. The fourth camera may be a left camera with a normal lens and having a field of view focusing on the environment facing a left, front of the vehicle, and the fifth camera may be a right camera with a normal lens and having a field of view focusing on the environment facing a right, front of host vehicle 1204. Various other alternative camera arrangements are consistent with the disclosed embodiments and the foregoing is but one example arrangement.

Database 1210 may include a map database configured to store map data for the components of system 1200 (e.g., server 1202 and/or host vehicle 1204). In some embodiments, server 1202 and/or processing unit 1206 may be configured to access database 1210 and obtain data stored from and/or upload data to database 1210 via network 1212. For example, server 1202 may transmit data relating to map information to database 1210 for storage. Processing unit 1206 may download map information and/or data from database 1210. In some embodiments, database 1210 may include indicators of detected wheel slip conditions with respect to one or more geographic locations. Database 1210 may also include information regarding various items, including roads, locations of identified wheel slip conditions, water features, geographic features, businesses, points of interest, restaurants, gas stations, or the like, or a combination thereof. In some embodiments, database 1210 may include a database similar to map database 160 and any other map database and systems described elsewhere in this disclosure.

Consistent with an embodiment of the disclosure, navigation system 1200 may determine if and how much a wheel has slipped or locked relative to the vehicle's chassis, based on comparison of the predicted wheel rotation to the measured wheel rotation. For example, when traveling an icy road, application of the vehicle's brakes may cause the vehicle to skid. In such a situation, a typical wheel speed sensor in the vehicle may report no movement of the wheels due to the skid. However, processing unit 1206 may individually detect a wheel slip condition for each of the wheels of the vehicle based on the determined motion of the vehicle and the measured wheel rotation. Thereafter, processing unit 1206 may predict imminent motion of the vehicle caused by the wheel slip condition and determine at least one navigational action in response to the predicted imminent motion of the vehicle. Additionally, although some wheel speed sensors might detect a wheel slip condition, the output of these sensors may not be able to identify which of the wheels has slipped. In contrast, navigation system 1200 may not only detect the occurrence of the wheel slip condition but may further associate that wheel slip condition with a specific wheel of the vehicle based on image analysis.

Consistent with another embodiment of the disclosure, navigation system 1200 may detect potential problems with one or more mechanical components of host vehicle 1204 based on a comparison between a predicted wheel rotation (determined using image analysis) and a measured wheel rotation for the at least one wheel of the vehicle. For example, navigation system 1200 may determine when a tire has started to leak or has become flat. To do so, processing unit 1206 may detect when a tire has started to leak by estimating a wheel rotation based on a turn rate and predicting the movement of the left and/or right wheels. If the wheel rotation is within an expected range, then the tire pressure may be within an expected operational range. If the wheel rotation is not within an expected operational range, then the tire may be leaking air or may be flat.

Consistent with yet another embodiment, a computing device of navigation system 1200 (e.g., server 1202) may operate in conjunction with a Road Experience Management (REM) mapping system to detect locations of potential hazards. Locations of potential hazards may be determined by detecting a plurality of host vehicles 1204 that experience a common or similar wheel slip condition. For example, server 1202 may collect data from a plurality of individual drives along a road segment to determine that a wheel slip condition of one or more host vehicles 1204 was not the result of a driver action but rather the result of one or more conditions of a road segment. Thereafter, server 1202 may distribute map information to other vehicles traveling the road segment that includes information specifying the location of the potential hazard.

Figure 13:
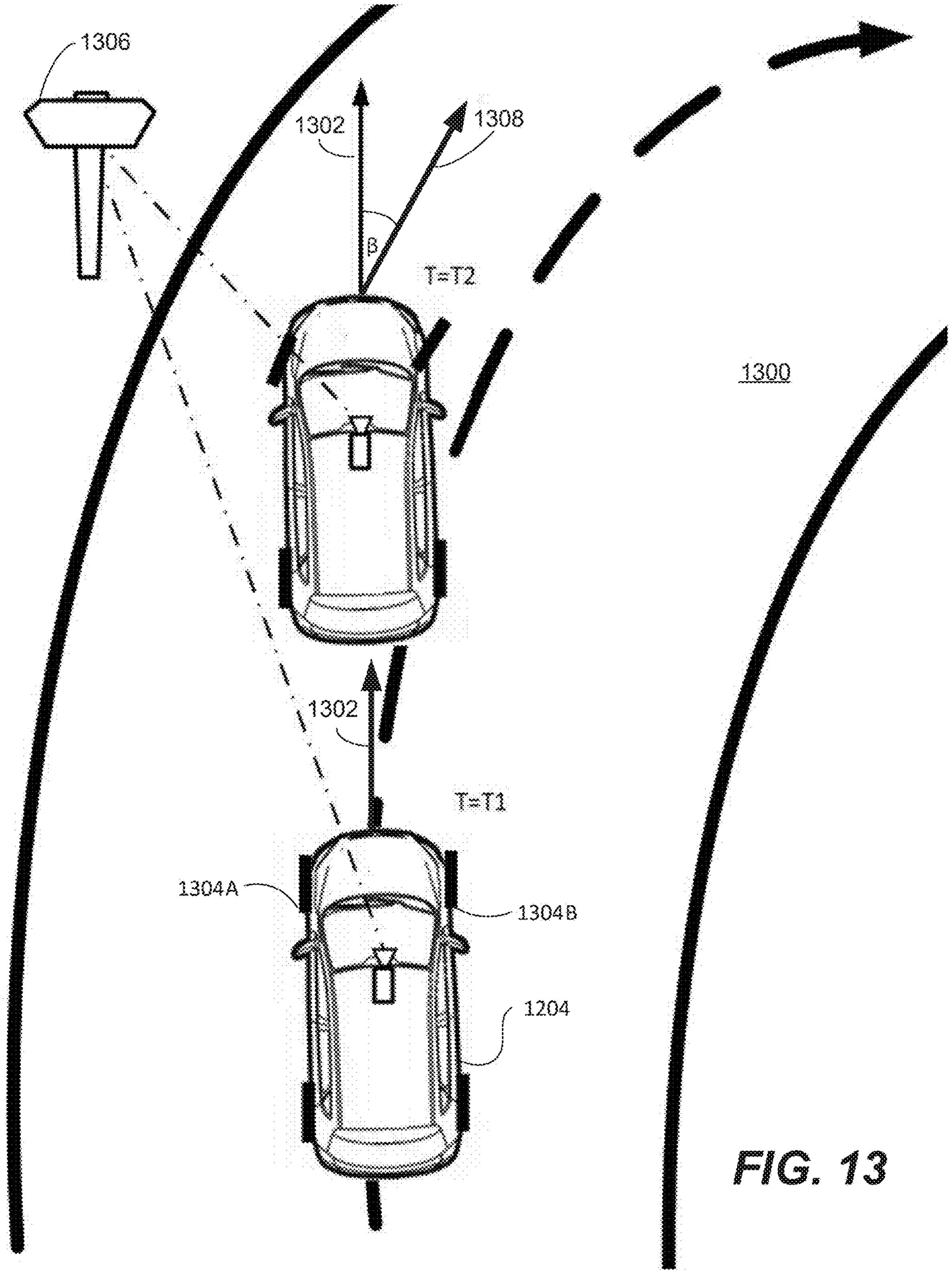
FIG. 13 is a schematic illustration of a roadway including representations of a vehicle at two different points in time, consistent with the disclosed embodiments.

FIG. 13 is a schematic illustration of a roadway including host vehicle 1204 at two different points in time, consistent with the disclosed embodiments. As depicted in the figure, at $T_1$, host vehicle 1204 is driving road 1300 along a driving direction 1302 and front wheels 1304A and 1304B are about to be turned right by a human driver or by steering system 240. Also, at $T_1$, camera 1208 acquires an image frame of a traffic sign 1306. Processing unit 1206 may determine, based on analysis of an image captured at $T_1$ and at least one image captured before $T_1$, one or more indicators of a motion of host vehicle 1204 relative to the capture times associated with the acquired images. For example, processing unit 1206 may use velocity and acceleration module 406 to determine the actual motion of host vehicle 1204 at $T_1$. Thereafter, processing unit 1206 may determine, for at least one wheel of the vehicle, a predicted wheel rotation corresponding to the motion of host vehicle 1204 relative to the capture times associated with the acquired images. Consistent with some embodiments, processing unit 1206 may receive one or more sensor outputs indicative of the measured wheel rotation associated with the at least one wheel of host vehicle 1204. As discussed above, determining the wheel rotation using wheel speed sensors may be accurate in conditions where no slip exists, but may become inaccurate when wheel slip condition occurs, as the measured wheel rotation may not match or may not be consistent with the actual motion of a vehicle during the periods of slip. For example, on an icy road, host vehicle 1204 may be sliding along a roadway while traditional wheel rotation sensing methods indicate that the wheels are rotating very little or not at all.

Consistent with the present disclosure, the disclosed system may be configured to detect a wheel slip condition associated with at least one wheel of the vehicle. In a first embodiment, the detected wheel slip condition may include a lateral slip. This embodiment is illustrated in at $T_2$. As shown, host vehicle 1204 is located further ahead on road 1300, but failed to take the right turn because of a wheel slip condition. Specifically, while front wheels 1304A and 1304B of host vehicle 1204 are pointing towards a desired direction 1308, host vehicle 1204 has instead moved along driving direction 1302. The lateral slip angle of host vehicle 1204 describes the ratio of forward and lateral velocities in the form of an angle. The lateral slip angle is the angle between a rolling wheel's actual direction of travel and the direction towards which it is pointing. In other words, the lateral slip angle represents the difference between where the vehicle is pointing (heading) and where the vehicle is actually going to travel. Consistent with the present disclosure, processing unit 1206 may use image analysis to determine information indicative of the actual motion of host vehicle 1204 and, based on that information, detect that a lateral slip associated with at least one wheel of the vehicle took place at $T_2$. Processing unit 1206 may quantify an amount associated with the lateral slip. For example, the amount of the lateral slip may be detectable for slip angles greater than 1 milliradian, greater than 5 milliradian, less than 10 milliradian, or less than 5 milliradian. In cases where the detected wheel slip condition includes a lateral slip, the motion of host vehicle 1204 may be determined with respect to at least five degrees of freedom. For example, in some embodiments, the motion of host vehicle 1204 may be determined with respect to three rotational degrees of freedom and two translational degrees of freedom.

In some embodiments, the detected wheel slip condition may include a longitudinal slip. For example, when driving on an icy road, host vehicle 1204 may be sliding along its driving direction while wheel rotation sensing methods indicate that the wheels are rotating very little or not at all. In this case, the lateral slip angle will be zero, because the angle of wheel's direction of travel and the direction towards they are pointing are the same. As used herein, the term "longitudinal slip angle" may refer to a rotational angle difference between a predicted wheel rotation (e.g., based on images analysis) and an observed wheel rotation (e.g., based on sensor outputs). To detect a longitudinal slip, processing unit 1206 may use at least three images, and the motion of the vehicle may be determined with respect to at least six degrees of freedom. For example, in some embodiments, the motion of the vehicle may be determined with respect to three rotational degrees of freedom and three translational degrees of freedom. Using the at least three images may allow the disclosed system to determine scale and a ratio of scale (e.g., by comparing a) the changes between the first image to the second image to b) the changes between the second image and the third image). Consistent with the present disclosure, when the detected wheel slip condition includes a longitudinal slip, processing unit 1206 may quantify an amount associated with the longitudinal slip. The amount of the longitudinal slip may be detectable for longitudinal slip angles greater than 1 milliradian, greater than 3 milliradian, less than 10 milliradian, or less than 5 milliradian.

As described above, processing unit 1206 may use image analysis to achieve a highly accurate determination of one or more indicators of a motion of the vehicle, which can be used to determine a predicted wheel rotation for each wheel independently and that correlates with the determined vehicle motion. For example, processing unit 1206 may use input from at least one camera 1208 (and sometimes from multiple cameras) to acquire a stream of a plurality of images relative to an environment of host vehicle 1204. The motion of the vehicle may be determined relative to capture times associated with two or more of the plurality of images. For example, detected changes in image representations of objects from an image captured at $T_1$ and an image captured at $T_2$ may provide a basis for determining one or more indicators of a motion of the vehicle along multiple degrees of freedom relative to objects in the environment of host vehicle 1204. For example, a rate of a size increase of an image representation of sign 1306 between frames may indicate a relative velocity between host vehicle 1204 and sign 1306. As another example, an observed trajectory, across captured image frames, of an object representation may indicate a yaw rate of host vehicle 1204. Using these and other types of image analysis techniques, a representation of a vehicle's ego-motion may be obtained at any desired periodic rate (e.g., 18 Hz, or any other suitable rate). Thereafter, the vehicle's ego-motion may be used to determine the expected rotation of each individual wheel on host vehicle 1204. The predicted wheel rotation may be determined by processing unit 1206 at the same or different rate than the determined ego-motion of the vehicle.

Figure 14:
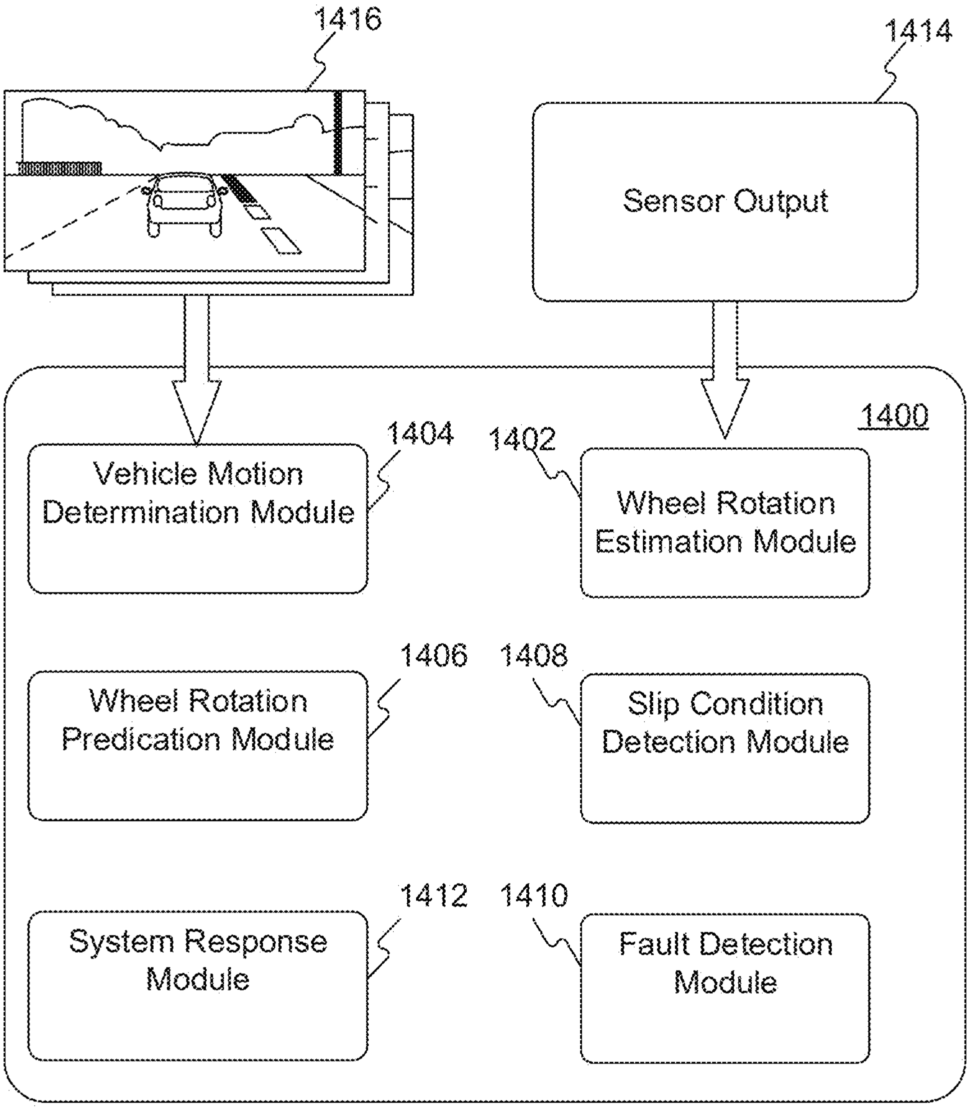
FIG. 14 illustrates an exemplary embodiment of a memory containing software modules consistent with the present disclosure.

FIG. 14 illustrates examples in which the disclosed system detects a wheel condition that may be a slip of at least one wheel or a fault of a mechanical component of the vehicle. FIG. 14 is an exemplary functional block diagram of memory 1400, which may be stored/programmed with instructions for performing one or more operations consistent with the disclosed embodiments, such as initiating a navigational action based on a detected wheel condition. Memory 1400 includes wheel rotation estimation module 1402, vehicle motion determination module 1404, wheel rotation prediction module 1406, slip condition detection module 1408, fault detection module 1410, and system response module 1412. Modules 1402, 1404, 1406, 1408, 1410, and 1412 may contain software instructions that are executable by at least one processing device included with processing unit 1206 or server 1202. The disclosed embodiments are not limited to any particular configuration of memory 1400. In some embodiments, memory 1400 may be part of system 1200 and may correspond to, for example, database 1210. Alternatively, memory 1400 may be stored in an internal data structure or an external storage associated with server 1202 or processing unit 1206.

Wheel rotation estimation module 1402 may be configured to receive one or more sensor outputs 1414 from at least one wheel speed sensor such as, for example, a wheel RPM sensor, an inertial sensor, a MEMS device, etc. The one or more sensor outputs may be indicative of the measured wheel rotation associated with the wheels of the host vehicle. For example, the one or more sensor outputs may include at least some of: the speed magnitude, longitudinal angle, lateral angle, and forward/backward movement direction. Moreover, wheel rotation estimation module 1402 may be configured to determine a direction of rotation associated with each wheel of the vehicle. As mentioned above, sensor outputs 1414 may be dependent on a host vehicle's wheels current properties (e.g., wheel's air pressure) and thus in many cases may be insufficient to provide accurate individual measurements for each of the wheels of the vehicle.

Vehicle motion determination module 1404 may be configured to receive a plurality of images 1416 from camera 1208 and determine one or more indicators of a motion of the vehicle. The plurality of image frames 1416 may be representative of the environment of the vehicle and may include representations of one or more objects within the environment of the host vehicle. In some embodiments, the one or more indicators of a motion of the vehicle may be estimated based on an optical flow analysis of the captured images. An optical flow analysis of a sequence of images may identify movement of pixels from the sequence of images. The identified movement may be used to determine a motion (e.g., ego motion) of the vehicle (e.g., three-dimensional translation and three-dimensional rotation of the vehicle). Consistent with the present disclosure, the ego motion of the vehicle may be integrated over time and along the road segment to reconstruct a trajectory associated with the road segment that the vehicle has traveled. In one embodiment, vehicle motion determination module 1404 may analyze the ego motion of the vehicle relative to capture times associated with the two or more of the plurality of images to determine how much each wheel of the vehicle has moved from one image frame to a subsequent image frame. A person skilled in the art will recognize the value in determining the individual motion of each wheel, because the movement of the wheels of the vehicle is not necessary the same in certain conditions such as, for example, when the vehicle turns. In some embodiments, vehicle motion determination module 1404 may use image data from more than one camera (e.g., two cameras, three cameras, four cameras, five cameras, etc.). Using multiple cameras may improve accuracy of the vehicle's motion determination because each camera may provide independent ego motion results for the vehicle that may be averaged to achieve a result with increased accuracy.

Wheel rotation prediction module 1406 may be configured to determine, for at least one wheel of the vehicle, a predicted wheel rotation corresponding to the motion of the vehicle relative to capture times associated with the two or more of the plurality of images. Consistent with the present disclosure, wheel rotation prediction module 1406 may determine the predicted wheel rotation using the ego motion of the vehicle and additional information, such as, the circumference of the wheels and the air pressure of the wheels. In some embodiments, the predicted wheel rotation may be determined by a specific mathematical model applied to collected data that includes the indicators of a motion. For example, a machine learning model may be trained using training data (e.g., training examples) to determine the predicted wheel rotation. Such training data may include a set of images and a set of indicators of motion together with measured data indicating the actual wheel rotation of each of the wheels of a vehicle, and/or any other data (e.g., a circumference of the wheels) relevant to training a machine to predict wheel rotation. In some examples, an artificial neural network (such as deep neural network, convolutional neural network, etc.) may be configured (for example, manually, using machine learning methods, by combining other artificial neural networks, etc.) to predict wheel rotation.

Slip condition detection module 1408 may use data from wheel rotation estimation module 1402, vehicle motion determination module 1404, and wheel rotation prediction module 1406 to detect a wheel slip condition associated with at least one wheel of the vehicle. In one embodiment, slip condition detection module 1408 may detect the wheel slip condition based on one or more indicators of a motion of the vehicle. For example, some lateral slips may be detected using indicators of a motion of the vehicle. In another embodiment, slip condition detection module 1408 may detect the wheel slip condition based on a discrepancy between a predicted wheel rotation and a measured wheel rotation. For example, longitudinal slips may be detected by comparing a predicted wheel rotation and a measured wheel rotation. The discrepancy between the predicted wheel rotation and the measured wheel rotation may indicate that one or more of the vehicle's wheels are slipping due to a wet or icy road, due to a lateral skid of the vehicle, or due to a loss of traction by one or more wheels under power, among other conditions. In real life, a wheel slip condition typically includes both a lateral slip and a longitudinal slip. Slip condition detection module 1408 may quantify the amount of the part of the wheel slip condition associated with the lateral slip and quantify the amount of the part of the wheel slip condition associated with the longitudinal slip. For example, a detected wheel slip condition may be comprised of 30% lateral slip and 70% longitudinal slip.

Fault detection module 1410 may use data from wheel rotation estimation module 1402, vehicle motion determination module 1404, and wheel rotation prediction module 1406 to detect a fault condition associated with a wheel of the vehicle. As discussed above, wheel motion may be determined based on two independent paths: the first path may use data from wheel rotation estimation module 1402 and the second path may use data from vehicle motion determination module 1404. Using parallel independent paths advantageously provides an ability to determine whether a wheel rotation signal conforms with an expected rotation level consistent with a vehicle's motion. Where the predicted wheel rotation does not conform to an observed wheel rotation, fault detection module 1410 may determine that there may be an issue causing the unexpected rotation conditions. In some cases, a discrepancy between the predicted wheel rotation and the measured wheel rotation may indicate the presence of a flat tire (or a loss in air pressure). For example, since the circumference of the wheel may change due to changing air pressure, the measured wheel rotation may not match a predicted wheel rotation associated with inflated tires.

System response module 1412 may be configured to receive data from slip condition detection module 1408 and/or fault detection module 1410 to determine a system response. A first type of system response may include initiating at least one navigational action, as described above in detail with reference to navigational response module 408. Other types of navigational action may involve control throttling system 220, braking system 230, and/or steering system 240. Specifically, the navigational action may be determined on a wheel-by-wheel basis using data from slip condition detection module 1408 and/or data from fault detection module 1410. Examples of navigational actions may include: actuation of an ABS by selective braking associated with at least one wheel of the vehicle, actuation of a steering system by selective steering control of at least one wheel of the vehicle, actuation of a traction control system by selective application of power to at least one wheel of the vehicle, and actuation of a suspension system by selective control of one or more active suspension components associated with at least one wheel of the vehicle. A second type of system response may include providing alerts to a driver of the vehicle. Examples of such alerts may include: an alert that a slip condition has been detected with respect to at least one wheel of the vehicle, an alert that a slip condition has been detected and an identification of each wheel of the vehicle for which a slip condition has been detected, an alert that at least one tire of the vehicle is not properly inflated, an alert that at least one wheel of the vehicle is not properly aligned, and an alert that at least one differential of the vehicle is not operating properly. A third type of system response may include transmitting one or more indicators associated with the detected slip condition to a server-based system remotely located relative to the vehicle or to other vehicles located in proximity to the vehicle. Examples of such indicators that may be transmitted include image data associated with the detected slip condition, location information for an area associated the detected slip condition, characteristics of the detected slip condition, details about the vehicle, details about the driver, time of day and more. The transmission of the indicators associated with the detected slip condition to other vehicles or to the server-based system may be used to, for example, reroute or warn other vehicles. Additional details on this embodiment are described below with reference to FIGS. 16 and 17.

Figure 15:
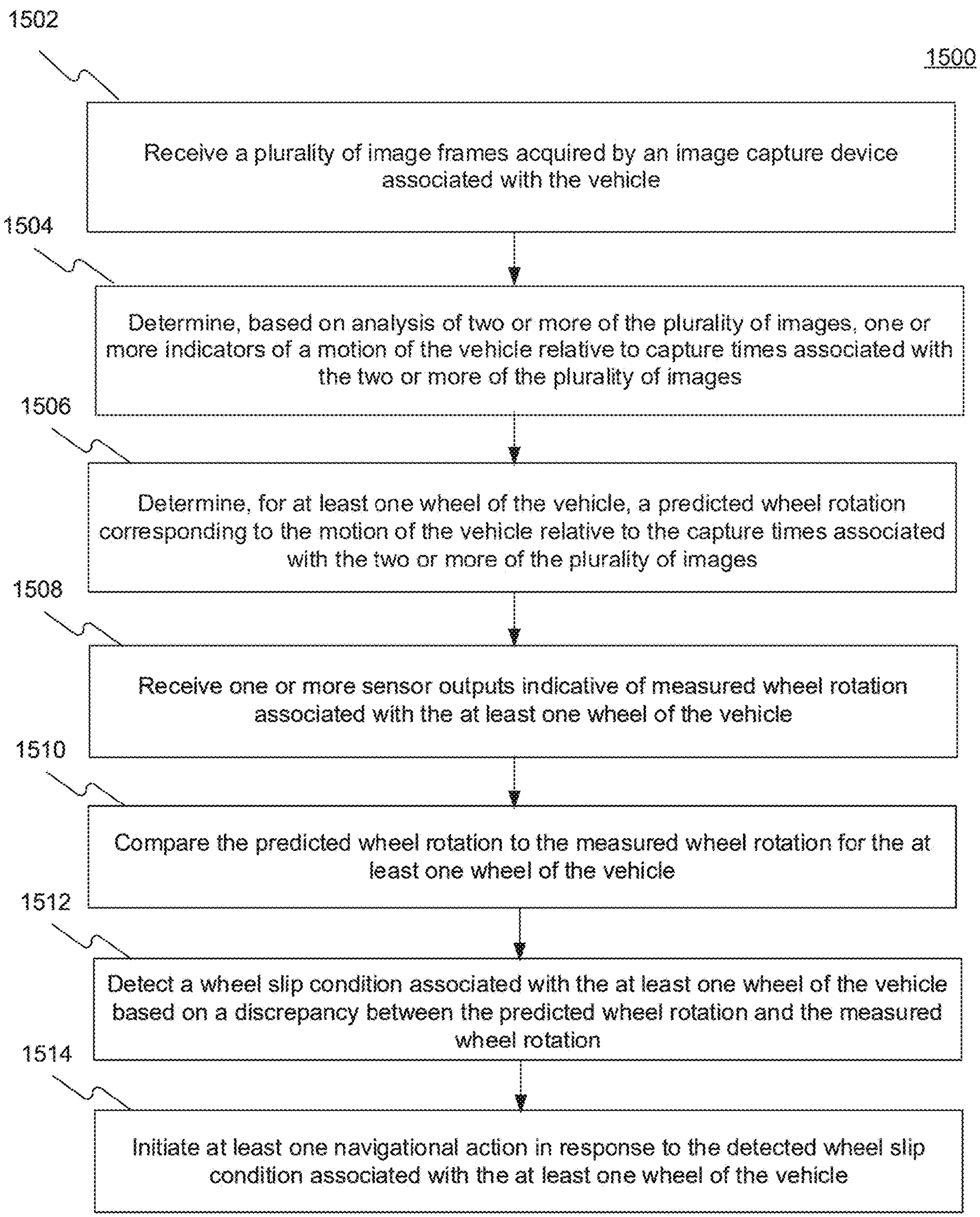
FIG. 15 is a flowchart showing an example process for navigating a vehicle based on a detected slip condition, consistent with the disclosed embodiments.

FIG. 15 is a flowchart showing an example process 1500 for navigating a vehicle, consistent with the disclosed embodiments. Process 1500 may be performed by at least one processing device associated with a host vehicle, such as processing unit 110 or processing unit 1206, as described above. Accordingly, process 1500 may be implemented by an autonomous or semi-autonomous vehicle and may be used for navigation of the host vehicle. It is to be understood that throughout the present disclosure, the terms "processor" and "processing unit" are used as a shorthand for "at least one processor" and "at least one processing unit," respectively. In other words, a processor or a processing unit may include one or more structures (e.g., circuitry) that perform logic operations whether such structures are collocated, connected, or disbursed. In some embodiments, a non-transitory computer readable medium may contain instructions that when executed by a processor cause the processor to perform process 1500. Further, process 1500 is not necessarily limited to the steps shown in FIG. 15, and any steps or processes of the various embodiments described throughout the present disclosure may also be included in process 1500, including those described above with respect to, for example, FIGS. 12-14.

In step 1502, process 1500 includes receiving a plurality of images acquired by an image capture device associated with the vehicle. The plurality of image frames may be representative of an environment of the vehicle. Consistent with disclosed embodiments, the plurality of images may be received at a predetermined rate, for example, at 15 Hz, at 18 Hz, at 20 Hz, or at higher rates. In some embodiments, the plurality of images may be acquired by a plurality of image capture devices associated with the vehicle, for example, three image capture devices, five image capture devices, or more.

In step 1504, process 1500 includes determining, based on analysis of two or more of the plurality of images, one or more indicators of a motion of the vehicle relative to capture times associated with the two or more of the plurality of images. In the context of the present disclosure, the term "indicators of a motion" may include any information indicative of the velocity of the vehicle with respect to at least three, four, five, or six degrees of freedom and/or any information regarding the acceleration of the vehicle with respect to at least three, four, five, or six degrees of freedom. In some cases, the indicators of a motion may be specific to different parts of the vehicle. For example, in cases of a lateral slip, the acceleration of the front of the vehicle may differ from the acceleration of the tail of the vehicle. Moreover, in some embodiments, the term "relative to capture times" may refer to between capture times and may include, for example, from a first capture time to a second capture time. For example, with reference to FIG. 13, the indicators of the motion of the vehicle may be relative to $T_1$ and $T_2$. Consistent with disclosed embodiments, the processor may be configured to determine a direction of rotation associated with each wheel of the vehicle. The determination of the direction of rotation associated with each wheel of the vehicle may be based on the image analysis or based on one or more sensor outputs indicative of measured wheel rotation.

In step 1506, process 1500 includes determining, for at least one wheel of the vehicle, a predicted wheel rotation corresponding to the motion of the vehicle relative to the capture times associated with the two or more of the plurality of images. Consistent with disclosed embodiments, the predicted wheel rotation corresponding to the motion of the vehicle may be determined independently for each wheel of the vehicle or for some of the wheels of the vehicle. For example, in case the vehicle is a semi-truck with eighteen wheels, the processor may determine the predicted wheel rotation for only a subset of the eighteen wheels or for all of the eighteen wheels. In some embodiments, the prediction method used to determine the predicted wheel rotation may include a combination of methods from the fields of statistics, machine learning, and artificial intelligence. In one embodiment, the processor may determine the predicted wheel rotation based on the one or more indicators of the motion of the vehicle and may be based on additional data, such as a circumference of the wheels.

In step 1508, process 1500 includes receiving one or more sensor outputs indicative of measured wheel rotation associated with the at least one wheel of the vehicle. In some embodiments, the one or more sensor outputs include sensor output from one or more wheel RPM sensors configured to measure the rotation speed of wheels. In addition, the vehicle may also include at least one of a GPS receiver and/or an inertial sensor that may be used to determine ego motion and/or to estimate or predict the actual wheel rotation.

In step 1510, process 1500 includes comparing the predicted wheel rotation to the measured wheel rotation for the at least one wheel of the vehicle. As used herein, the term "comparing" refers to assessing how the predicted wheel rotation determined from image analysis relates to or differs from the measured wheel rotation. In some cases, the comparing may be performed by applying an artificial intelligence algorithm configured to identify a discrepancy between the predicted wheel rotation and the measured wheel rotation.

In step 1512, process 1500 includes detecting a wheel slip condition associated with the at least one wheel of the vehicle based on a discrepancy between the predicted wheel rotation and the measured wheel rotation. In some embodiments, when the detected wheel slip condition includes a lateral slip, the processor may quantify an amount associated with the lateral slip. The amount of the lateral slip may be detectable for lateral slip angles greater than 1 milliradian, greater than 3 milliradian, greater than 5 milliradian. Alternatively, the amount of the lateral slip may be detectable for lateral slip angles less than 10 milliradian, less than 5 milliradian, less than 3 milliradian. In cases where the detected wheel slip condition includes a lateral slip, the motion of the vehicle may be determined with respect to at least five degrees of freedom. For example, the motion of the vehicle may be determined with respect to three rotational degrees of freedom and two translational degrees of freedom. In other embodiments, when the detected wheel slip condition includes longitudinal slip, the processor may quantify an amount associated with the longitudinal slip. The amount of the longitudinal slip may be detectable for longitudinal slip angles greater than 1 milliradian, greater than 3 milliradian, greater than 5 milliradian. Alternatively, the amount of the lateral slip may be detectable for longitudinal slip angles less than 10 milliradian, less than 5 milliradian, less than 3 milliradian. In cases where the detected wheel slip condition includes a longitudinal slip, at least three images may be used for the image analysis, and the motion of the vehicle may be determined with respect to at least six degrees of freedom. For example, the motion of the vehicle may be determined with respect to three rotational degrees of freedom and three translational degrees of freedom. In other embodiments, when the detected wheel slip condition includes both a lateral slip and a longitudinal slip, the processor may quantify an amount associated with each of the lateral slip and the longitudinal slip.

In step 1514, process 1500 includes initiating at least one navigational action in response to the detected wheel slip condition associated with the at least one wheel of the vehicle. In some embodiments, the at least one navigational action includes automatically modifying at least one aspect of an autonomous driving policy associated with a navigation system of the vehicle. For example, modifying at least one aspect of an autonomous driving policy may include changing the follow distance, changing the speed control, etc. In other embodiments, the at least one navigational action includes automatically re-routing the vehicle. For example, the processor may cause re-routing of the vehicle to a less curvy route, a slower route, etc. In additional embodiments, the at least one navigational action may include transmitting one or more indicators associated with the detected slip condition to a server-based system remotely located relative to the vehicle. For example, the processor may operate in conjunction with a REM mapping system to detect locations of potential hazards. The determination of the locations of potential hazards may be based on a set of indicators associated with a plurality of detected slip conditions associated with multiple drives.

Consistent with a first implantation of process 1500, the at least one navigational action may include providing an alert to an operator of the vehicle. In a first example, the alert may include an indication that a slip condition has been detected with respect to at least one wheel of the vehicle. In a second example, the alert may include an indication that a slip condition has been detected and an identification of each wheel of the vehicle for which a slip condition has been detected. In a third example, the alert may include an indication that at least one tire of the vehicle is not properly inflated. In a fourth example, the alert may include an indication that at least one wheel of the vehicle is not properly aligned. In a fifth example, the alert may include an indication that at least one differential of the vehicle is not operating properly. Specifically, the processor may determine that at least one differential of the vehicle is not operating properly when the discrepancy between the predicted wheel rotation (based on images analysis) and the observed wheel rotation (based on sensor outputs) during a turning motion matches a predefined pattern.

Consistent with a second implantation of process 1500, the at least one navigational action may include actuation of at least one system associated with the vehicle. For example, the processor may control the operation of the wheels of the vehicle on a wheel-by-wheel basis to counteract the detected slip condition or to provide a desired level of slip. In a first example, the system may include an Antilock Braking System (ABS), and actuation of the ABS includes selective braking associated with at least one wheel of the vehicle. In a second example, the system may include a steering system, and actuation of the steering system includes selective steering control of at least one wheel of the vehicle. In a third example, the system may include a traction control system, and actuation of the traction control system includes selective application of power to at least one wheel of the vehicle. In a fourth example, the system may include a suspension system, and actuation of the suspension system includes selective control of one or more active suspension components associated with at least one wheel of the vehicle.

Figure 16:
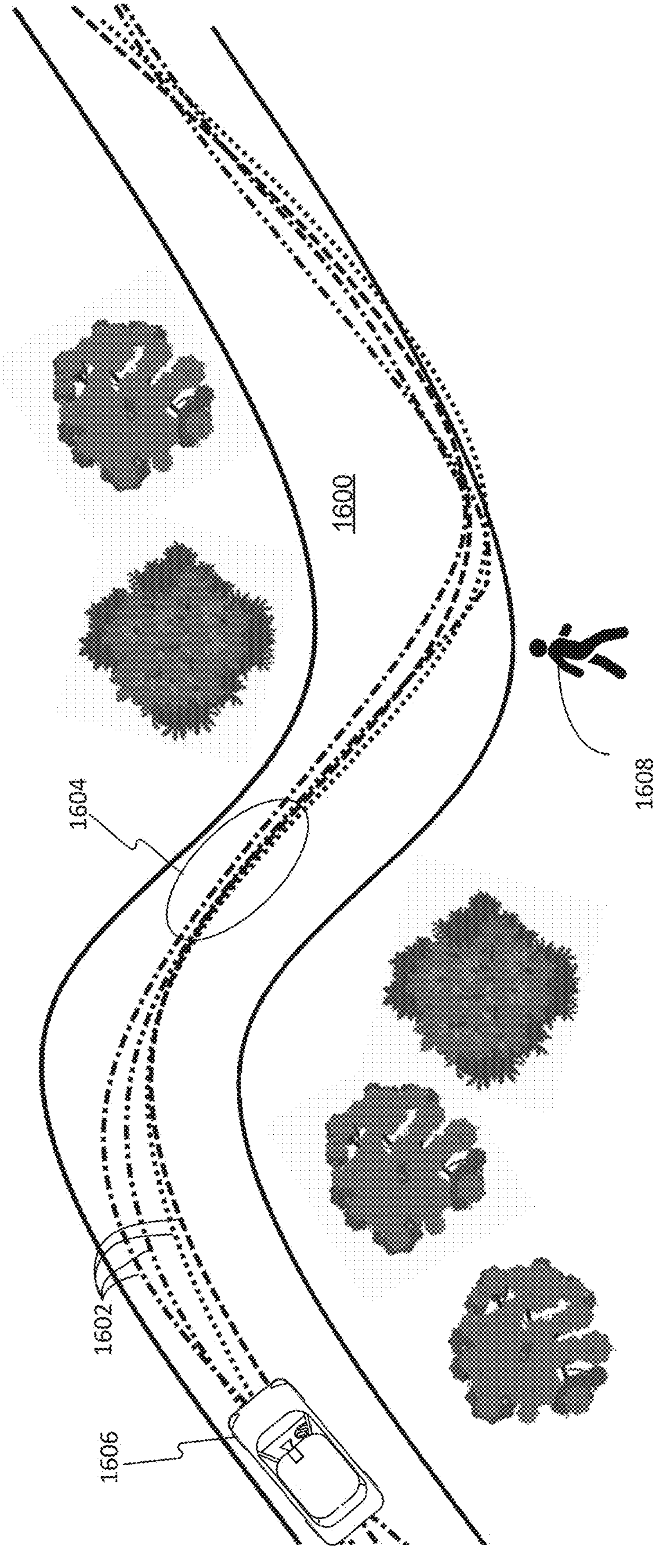
FIG. 16 is a schematic illustration of a roadway including representations of previous drives, consistent with the disclosed embodiments.

FIG. 16 illustrates an example in which the disclosed system harvests crowdsourced information about wheel slip conditions collected from multiple host vehicles to update map information with locations of potential hazards. As depicted in FIG. 16, a roadway 1600 includes representations 1602 of a plurality of previous drives. Each of the plurality of previous drives may be associated with one of the harvesting vehicles. In some embodiments, a particular one of the plurality of harvesting vehicles may be associated with two or more of the previously drives (e.g., a harvesting vehicle may have traveled roadway 1600 on multiple occasions). Consistent with the disclosed embodiments, system 1200 may receive from a plurality of harvesting vehicles indicators of detected wheel slip conditions associated with at least one wheel of each harvesting vehicle. The indicators of the detected slip conditions may include image data associated with the detected slip condition, location of an area associated the detected slip condition, characteristics of the detected slip condition, details of the vehicle, details on a driver of the vehicle, time of day, temperature outside the vehicle, and more. System 1200 may correlate the indicators of detected wheel slip conditions with respect to one or more geographic locations. In one embodiment, system 1200 may integrate the indicators of detected wheel slip conditions associated with at least one wheel over time relative to the one or more geographic locations to determine changes in road surface conditions over time. With reference to the illustrated example, system 1200 may identify a particular road segment 1604 as one having slippery conditions. Thereafter, system 1200 may generate and transmit information to at least one entity based on the correlated indicators of detected wheel slip conditions with respect to one or more geographic locations. The transmitted information may include at least one of: an alert distributed to a plurality of navigating vehicles, an indication of a restricted access zone, instructions to a change to a planned navigation route, and an identification of at least one road segment where a road surface condition has been linked to detected wheel slip conditions. With reference to the illustrated example, system 1200 may transmit navigational information to a road-user entity (e.g., vehicle 1606 or a pedestrian 1608 who may travel across roadway 1600 or near roadway 1600) that may be affected by particular road segment 1604. In other examples, system 1200 may transmit the information to a non-road-user entity, such as, a municipal traffic-control system, contractors responsible for infrastructure repair and maintenance, and more.

Consistent with the present disclosure, system 1200 may use the collected data about detected wheel slip conditions in conjunction with the REM mapping system. The REM mapping system may make use of crowdsourced information collected from multiple drives to generate and/or refine maps associated with road segments. In some embodiments, the REM maps may include trajectories (e.g., three-dimensional splines) available to vehicles (e.g., host or target/detected vehicles) traveling on a roadway associated with a REM map. The REM maps may also include detected objects (e.g., a particular road segment associated with a detected slip condition, road signs, road edges, lane markings, bus stops, or any other recognizable feature associated with a roadway, etc.) and may associate the detected objects in the map with refined locations associated with one or more of the detected objects. The refined locations may be determined based on crowd-sourced location information determined during each of a plurality of individual drives of at least one of harvesting vehicle along a road segment. The detected objects and their locations from the map may be used in navigating an autonomous or partially autonomous vehicle (e.g., by assisting in determining where a vehicle is located relative to a target trajectory from the REM map).

To generate a crowdsourced REM map, drive information may be collected from multiple drives of at least one of harvesting vehicle along a road segment. This may include, for example, collecting drive information from one harvesting vehicle traveling in an area at different times and/or from multiple different harvesting vehicles traveling in the area. The mapping system may then align the collected to promote accuracy by filling in holes in drive data sets by refining object locations, and by refining vehicle trajectories. The mapping system may also request additional data on the location associated with detected wheel slip condition in order to increase its confidence level that the wheel slip condition was caused due to the conditions of the road and not due to the driver's performances. Accordingly, instances where vehicles did not experienced wheel slip condition at the particular road segments are also being collected, for example, per demand.

Consistent with the present disclosure, the disclosed systems and methods may be incorporated in the REM system to compare a path of travel of a vehicle that experienced a wheel slip condition with a reference path of travel associated with the road segment to determine how much the vehicle deviated from the reference path of travel. In some embodiments, system 1200 may use a parallax analysis to detect water or ice on a road. For example, the system may analyze on or more images to identify slippery conditions such as wet or icy roads based on glare in the images. In other embodiments, system 1200 may use crowdsourcing techniques to detect areas where wheels of a vehicle slipped on a road. The system may then upload to a mapping server information designating an area as one that is hazardous. The server may then distribute map information to vehicles traveling in the vicinity of the area indicating that the area includes a potential hazard. In other embodiments, system 1200 may determine that a wheel slip condition of a vehicle was not the result of a driver action but rather the result of conditions in the environment of the vehicle. In other embodiments, system 1200 may determine a time of day in which the wheel slip condition occurred at a particular road segment. For example, system 1200 may determine that patchy ice on a particular roadway is prevalent during the early morning hours. System 1200 may be configured to refrain from transmitting information about certain conditions (e.g., ice) to vehicles that approach the particular road segment at other times. In other embodiments, system 1200 may determine a set of weather conditions before and while the wheel slip condition occurred at a particular road segment. For example, system 1200 may identify patchy ice on a roadway when humidity is greater than a certain value and the temperature is lower than zero. System 1200 may be configured to refrain from transmitting information to vehicles that approach the particular road segment under different weather conditions that do not adversely affect the road surface.

Figure 17:
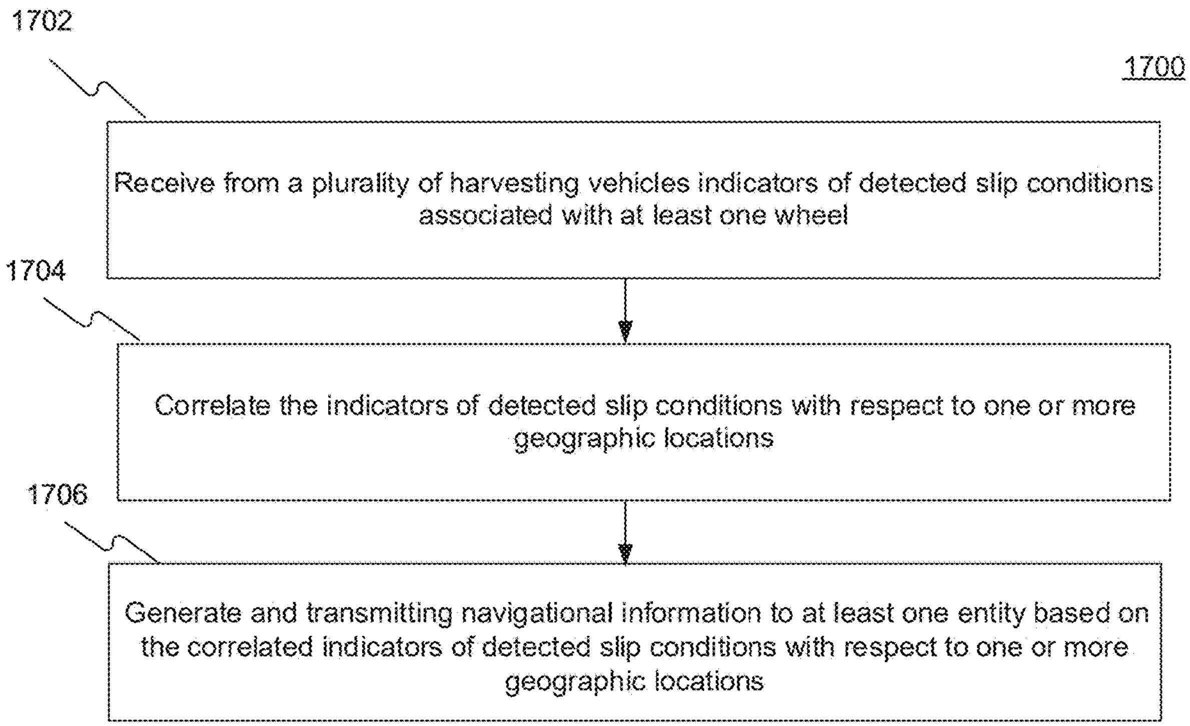
FIG. 17 is a flowchart showing an example process for using crowdsourcing to generate navigational information associated with detected slip conditions, consistent with the disclosed embodiments.

FIG. 17 is a flowchart showing an example process 1700, consistent with the disclosed embodiments. Process 1700 may be performed by at least one processing device associated with a server 1202. In some embodiments, a non-transitory computer readable medium may contain instructions that when executed by a processor cause the processor to perform process 1700. Further, process 1700 is not necessarily limited to the steps shown in FIG. 17, and any steps or processes of the various embodiments described throughout the present disclosure may also be included in process 1700, including those described above with respect to, for example, FIGS. 12-16.

In step 1702, process 1700 includes receiving from a plurality of harvesting vehicles indicators of detected wheel slip conditions associated with at least one wheel. The indicators of the detected wheel slip condition may include at least a first indicator of a location associated with a detected lateral slip condition and a second indicator of a location associated with a detected longitudinal slip condition. The first and second indicators of wheel slip detection may be determined based on analysis of at least two images captured by a camera of at least one vehicle during a drive along a road segment. For example, each of the plurality of harvesting vehicles may capture images along road segment and may determine a wheel slip condition using, for example, process 1500. In some embodiments, the indicators of detected wheel slip conditions associated with at least one wheel may be integrated over time relative to the one or more geographic locations to determine changes in road surface conditions over time. Process 1700 may also include receiving from additional harvesting vehicles indicators of non-slip conditions at the one or more geographic locations associated with the detected slip conditions. In some embodiments, the indicators of detected wheel slip conditions and the indicators of non-slip conditions may be integrated over time to update a confidence level associated with detected slip condition. For instance, the number of vehicles that experienced a slip condition at a certain geographic location are compared with the number vehicles that did not experienced a slip condition at the certain geographic location.

In step 1704, process 1700 includes correlating the indicators of detected wheel slip conditions with respect to one or more geographic locations. In some embodiments, the correlating may include determining a refined location of the detected slip condition based on the indicators of the detected slip condition. The refined location of the detected slip condition may be relative to a coordinate system local to the common road segment. In some embodiments, the coordinate system local to the common road segment may be based on a plurality of images captured by cameras on board the plurality of harvesting vehicles. For example, the coordinate system may be developed based on analysis of the images to determine a three-dimensional space associated with the road segment from which a three-dimensional coordinate system may be developed. Further details regarding three-dimensional coordinates for generating sparse maps are provided above. In some embodiments, the correlating may further include applying a curve fitting algorithm to a set of drive information associated with the harvesting vehicle that experienced the wheel slip condition. In other words, a curve defined by a mathematical function having a "best fit" with the indicators of the detected wheel slip condition may be determined. For example, a linear or nonlinear regression analysis may be performed to fit a curve to the drive information. In some embodiments, correlating the drive information may include determining an average location for a wheel slip condition based on a plurality of indicators from the plurality of harvesting vehicles.

In step 1706, process 1700 includes generating and transmitting navigational information to at least one entity based on the correlated indicators of detected wheel slip conditions with respect to one or more geographic locations. Consistent with the present disclosure, the navigational information may include an identification of at least one road segment where a road surface condition has been linked to detected wheel slip conditions. The identification may include a likely cause for the at least one road segment to become more slippery. In some embodiments, the navigational information includes an alert distributed to at least one vehicle associated with the server-based navigation system. For example, the alert includes may include identification of the existence of slippery conditions detected relative to a particular road segment. In other embodiments, the navigational information may include an indication of a restricted access zone. For example, a management system associated with the server-based navigation system may restrict a fleet of vehicles from navigating in a region where hazardous conditions are detected. In other embodiments, the navigational information may include a recommendation for a vehicle or a pedestrian that is approaching to the at least one road segment where a road surface condition has been linked to detected wheel slip conditions. The recommendation may include changing a planned navigation route for one or more vehicles (i.e., automatic re-routing vehicles to avoid that road segment) or restricting the maximum speed of vehicles that driving in that road segment.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A server-based navigation system, the system comprising:
- at least one processor associated with a memory, wherein the memory includes instructions that when executed by the at least one processor cause the at least one processor to:
  - receive from a plurality of harvesting vehicles indicators of detected wheel slip conditions associated with at least one wheel, wherein at least one of the plurality of harvesting vehicles detected at least one of the wheel slip conditions based on analysis of at least one image captured by a camera of the at least one of the plurality of harvesting vehicles;
  - correlate the indicators of detected wheel slip conditions with respect to one or more geographic locations; and
  - generate and transmit navigational information to at least one entity based on the correlated indicators of detected wheel slip conditions with respect to one or more geographic locations.

2. The system of claim 1, wherein the navigational information includes an alert distributed to a plurality of navigating vehicles.

3. The system of claim 2, wherein the alert includes an identification of the existence of slippery conditions detected relative to a particular road segment.

4. The system of claim 1, wherein the navigational information includes an indication of a restricted access zone.

5. The system of claim 1, wherein the navigational information includes a change to a planned navigation route for one or more vehicles.

6. The system of claim 1, wherein the navigational information includes an identification of at least one road segment where a road surface condition has been linked to detected wheel slip conditions.

7. The system of claim 1, wherein the indicators of detected wheel slip conditions associated with at least one wheel are integrated over time relative to the one or more geographic locations to determine changes in road surface conditions over time.

8. The system of claim 1, wherein
- the indicators of detected wheel slip conditions include at least location information associated with the detected wheel slip conditions, and
- the location information is determined by the harvesting vehicles based on the at least one image used in detecting the wheel slip conditions.

9. A non-transitory computer readable medium containing instructions that, when executed by at least one processor, cause the at least one processor to perform a method, the method comprising:
- receiving from a plurality of harvesting vehicles indicators of detected wheel slip conditions associated with at least one wheel, wherein at least one of the plurality of harvesting vehicles detected at least one of the wheel slip conditions based on analysis of at least one image captured by a camera of the at least one of the plurality of harvesting vehicles;
- correlating the indicators of detected wheel slip conditions with respect to one or more geographic locations; and
- generating and transmitting navigational information to at least one entity based on the correlated indicators of detected wheel slip conditions with respect to one or more geographic locations.

10. The medium of claim 9, wherein the navigational information includes an alert distributed to a plurality of navigating vehicles.

11. The medium of claim 10, wherein the alert includes an identification of the existence of slippery conditions detected relative to a particular road segment.

12. The medium of claim 9, wherein the navigational information includes an indication of a restricted access zone.

13. The medium of claim 9, wherein the navigational information includes a change to a planned navigation route for one or more vehicles.

14. The medium of claim 9, wherein the navigational information includes an identification of at least one road segment where a road surface condition has been linked to detected wheel slip conditions.

15. The medium of claim 9, wherein the indicators of detected wheel slip conditions associated with at least one wheel are integrated over time relative to the one or more geographic locations to determine changes in road surface conditions over time.

16. The medium of claim 9, wherein the indicators of detected wheel slip conditions include at least location information associated with the detected wheel slip conditions, and the location information is determined by the harvesting vehicles based on the at least one image used in detecting the wheel slip conditions.

17. A navigation method, comprising:

receiving from a plurality of harvesting vehicles indicators of detected wheel slip conditions associated with at least one wheel, wherein at least one of the plurality of harvesting vehicles detected at least one of the wheel slip conditions based on analysis of at least one image captured by a camera of the at least one of the plurality of harvesting vehicles;

correlating the indicators of detected wheel slip conditions with respect to one or more geographic locations; and generating and transmitting navigational information to at least one entity based on the correlated indicators of detected wheel slip conditions with respect to one or more geographic locations.

18. The method of claim 17, wherein the navigational information includes an alert distributed to a plurality of navigating vehicles.

19. The method of claim 18, wherein the alert includes an identification of the existence of slippery conditions detected relative to a particular road segment.

20. The method of claim 17, wherein the indicators of detected wheel slip conditions include at least location information associated with the detected wheel slip conditions, and the location information is determined by the harvesting vehicles based on the at least one image used in detecting the wheel slip conditions.

* * * * *